(12) United States Patent
Matsumura et al.

(10) Patent No.: US 12,579,605 B2
(45) Date of Patent: Mar. 17, 2026

(54) INFORMATION PROCESSING DEVICE AND METHOD OF CONTROLLING DISPLAY DEVICE

(71) Applicant: Sony Group Corporation, Tokyo (JP)

(72) Inventors: Kenicirou Matsumura, Tokyo (JP); Kuniichiro Naruse, Tokyo (JP); Keita Saito, Tokyo (JP); Akira Kurosawa, Tokyo (JP); Hiroki Takagaki, Tokyo (JP); Kiwako Miura, Tokyo (JP); Yuki Kobayashi, Tokyo (JP); Takehisa Gokaichi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 214 days.

(21) Appl. No.: 18/043,343

(22) PCT Filed: Sep. 7, 2021

(86) PCT No.: PCT/JP2021/032912
§ 371 (c)(1),
(2) Date: Feb. 28, 2023

(87) PCT Pub. No.: WO2022/050428
PCT Pub. Date: Mar. 10, 2022

(65) Prior Publication Data
US 2023/0334620 A1 Oct. 19, 2023

(30) Foreign Application Priority Data
Sep. 7, 2020 (JP) ................................. 2020-149886

(51) Int. Cl.
*G06T 3/40* (2024.01)
*G06F 9/44* (2018.01)
(52) U.S. Cl.
CPC . *G06T 3/40* (2013.01); *G06F 9/44* (2013.01)

(58) Field of Classification Search
None
See application file for complete search history.

(56) References Cited

U.S. PATENT DOCUMENTS

2014/0015743 A1* 1/2014 Seo ......................... G06F 3/017
                                                          345/156
2014/0204037 A1 7/2014 Kim
                          (Continued)

FOREIGN PATENT DOCUMENTS

CN        107688370 A      2/2018
JP      2011-209576 A     10/2011
                 (Continued)

OTHER PUBLICATIONS

International Search Report and Written Opinion mailed on Nov. 22, 2021, received for PCT Application PCT/JP2021/032912, filed on Sep. 7, 2021, 9 pages including English Translation.

*Primary Examiner* — Nicholas R Wilson
(74) *Attorney, Agent, or Firm* — XSENSUS LLP

(57) ABSTRACT

A display device is capable of switching between a first display mode and a second display mode, the second display mode having a larger display area than the first display mode. When the display mode is the first display mode in the first period, the display mode is the second display mode in the subsequent second period, and the display mode is the first display mode in the subsequent third period, an image generator (CCP_1) makes an image to be displayed at a start point of the third period to be different from an image displayed at an end point of the first period. In the third period, the image generator (CCP_1) uses a result of the processing in the second period.

23 Claims, 18 Drawing Sheets

(56)  References Cited

U.S. PATENT DOCUMENTS

| 2015/0325216 A1 | 11/2015 | Park et al. |
| 2017/0229100 A1 | 8/2017 | Chun et al. |
| 2020/0089459 A1 | 3/2020 | Zhang |

FOREIGN PATENT DOCUMENTS

| JP | 2019-67309 A | 4/2019 |
| JP | 2020-46957 A | 3/2020 |

* cited by examiner

Figure 9:
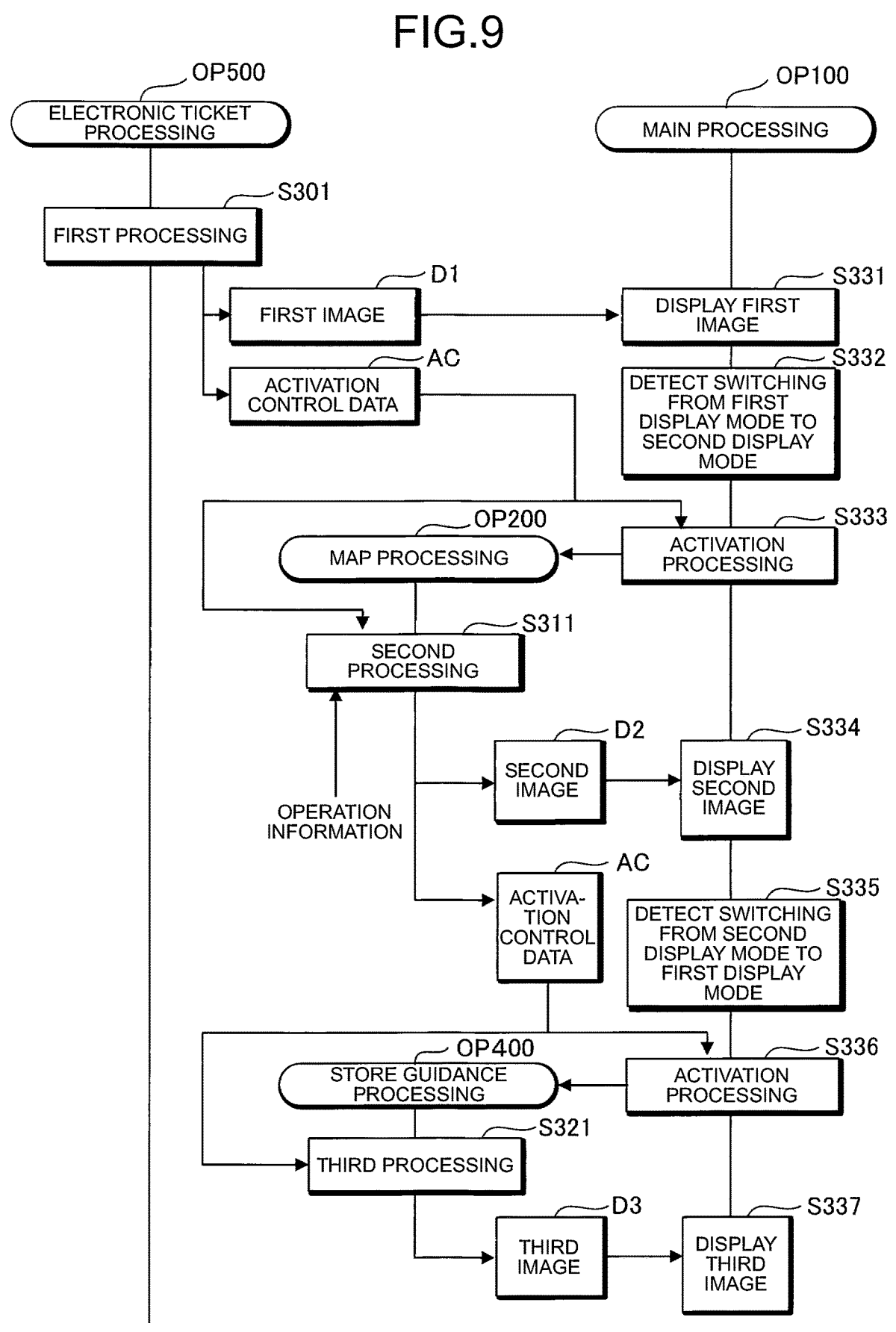

ELECTRONIC TICKET
PROCESSING

OP100

MAIN PROCESSING

S301

FIRST PROCESSING

D1

FIRST IMAGE

S331

DISPLAY FIRST
IMAGE

AC

ACTIVATION
CONTROL DATA

S332

DETECT SWITCHING
FROM FIRST
DISPLAY MODE TO
SECOND DISPLAY
MODE

OP200

MAP PROCESSING

S333

ACTIVATION
PROCESSING

S311

SECOND
PROCESSING

OPERATION
INFORMATION

D2

SECOND
IMAGE

S334

DISPLAY
SECOND
IMAGE

AC

ACTIVA-
TION
CONTROL
DATA

S335

DETECT SWITCHING
FROM SECOND
DISPLAY MODE TO
FIRST DISPLAY
MODE

OP400

STORE GUIDANCE
PROCESSING

S336

ACTIVATION
PROCESSING

S321

THIRD PROCESSING

D3

THIRD
IMAGE

S337

DISPLAY
THIRD
IMAGE

INFORMATION PROCESSING DEVICE AND METHOD OF CONTROLLING DISPLAY DEVICE

FIELD

The present invention relates to an information processing device and a method of controlling a display device.

BACKGROUND

In recent years, smartphones capable of displaying various types of information as well as being used for simple phone calls have become widespread. Patent Literature 1 discloses a foldable smartphone having both portability and large screen display. This smartphone is in a small screen display mode when the main body is closed, and transitions to a large screen display mode when the main body is open. In the large screen display mode, more detailed information is displayed on the large screen as compared with the small screen display mode.

CITATION LIST

Patent Literature

Patent Literature 1: JP 2019-67309 A

SUMMARY

Technical Problem

However, in the above-described smartphone, when the small screen display mode is switched from the small screen display mode to the large screen display mode and then the display mode is returned to the small screen display mode, the image to be displayed on the small screen is the image originally displayed in the display mode of the small screen. Therefore, the conventional smartphone has not been capable of having correlation between an image displayed in the large screen display mode and an image displayed on the subsequent small screen.

The present invention has been made in view of the above circumstances, and aims to improve convenience of an information processing device.

Solution to Problem

An information processing device that is one aspect of the present invention includes: a display device capable of switching a display mode between a first display mode and a second display mode, the second display mode having a display area larger than a display area in the first display mode; an image generator that generates first to third images such that, when a display mode of the display device is the first display mode over a first period, the display mode is the second display mode over a second period after the first period, and the display mode is the first display mode over a third period after the second period, the image generator generates a first image by first processing executed over the first period, generates a second image by second processing executed over the second period, and generates a third image by third processing executed over the third period; and a display controller that causes the display device to display the first image over the first period, causes the display device to display the second image over the second period, and causes the display device to display the third image over the third period, wherein an image displayed on the display device at a start point of the third period, out of the third images, is different from an image displayed on the display device at an end point of the first period, out of the first images, and the third processing uses a result of the second processing.

A method of controlling a display device that is one aspect of the present invention, the display device being capable of switching a display mode between a first display mode and a second display mode, the second display mode having a display area larger than a display area in the first display mode, the method includes: generating and displaying first to third images such that, when a display mode of the display device is the first display mode over a first period, the display mode is the second display mode over a second period after the first period, and the display mode is the first display mode over a third period after the second period, generating a first image by first processing executed over the first period and displaying the generated first image on the display device, generating a second image by second processing executed over the second period and displaying the generated second image on the display device, and generating a third image by third processing executed over the third period and displaying the generated third image on the display device, wherein an image displayed on the display device at a start point of the third period, out of the third images, is different from an image displayed on the display device at a start point of the first period, out of the first images, and the third processing uses a result of the second processing.

Advantageous Effects of Invention

According to the present invention, since the third image displayed at the start point in the third period is generated based on the result of the second processing, it is possible to allow the third image to have a correlation with the second image displayed at the end point of the second period. In addition, since the third image is different from the image displayed at the end point of the first period, new information can be provided to the user. As a result, the convenience of the information processing device is improved as compared with a case where the same image as the end point of the first period is displayed on the display device at the start point of the third period.

3

Figure 5:
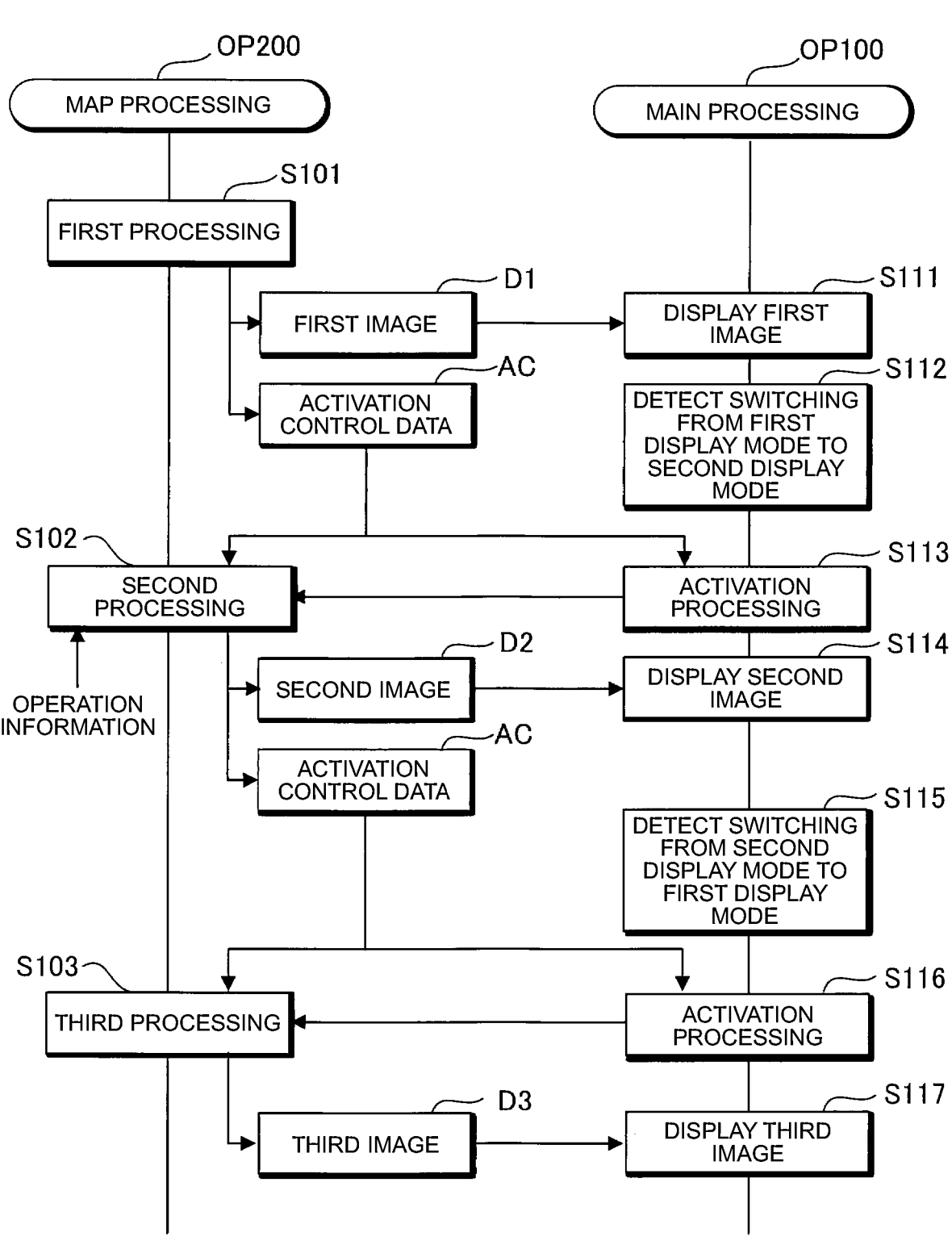

FIG. 5 is a sequence diagram illustrating a linkage between map processing executed by the processing device in accordance with a map application and main processing executed by the processing device in accordance with a control program in a first operation example of the information processing device.

Figure 6A:
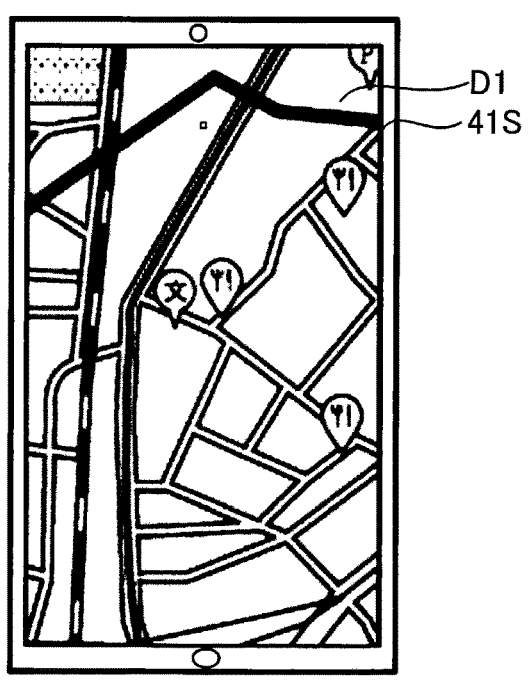

FIG. 6A is a diagram illustrating transition of a display screen of the information processing device in the first operation example.

Figure 6B:
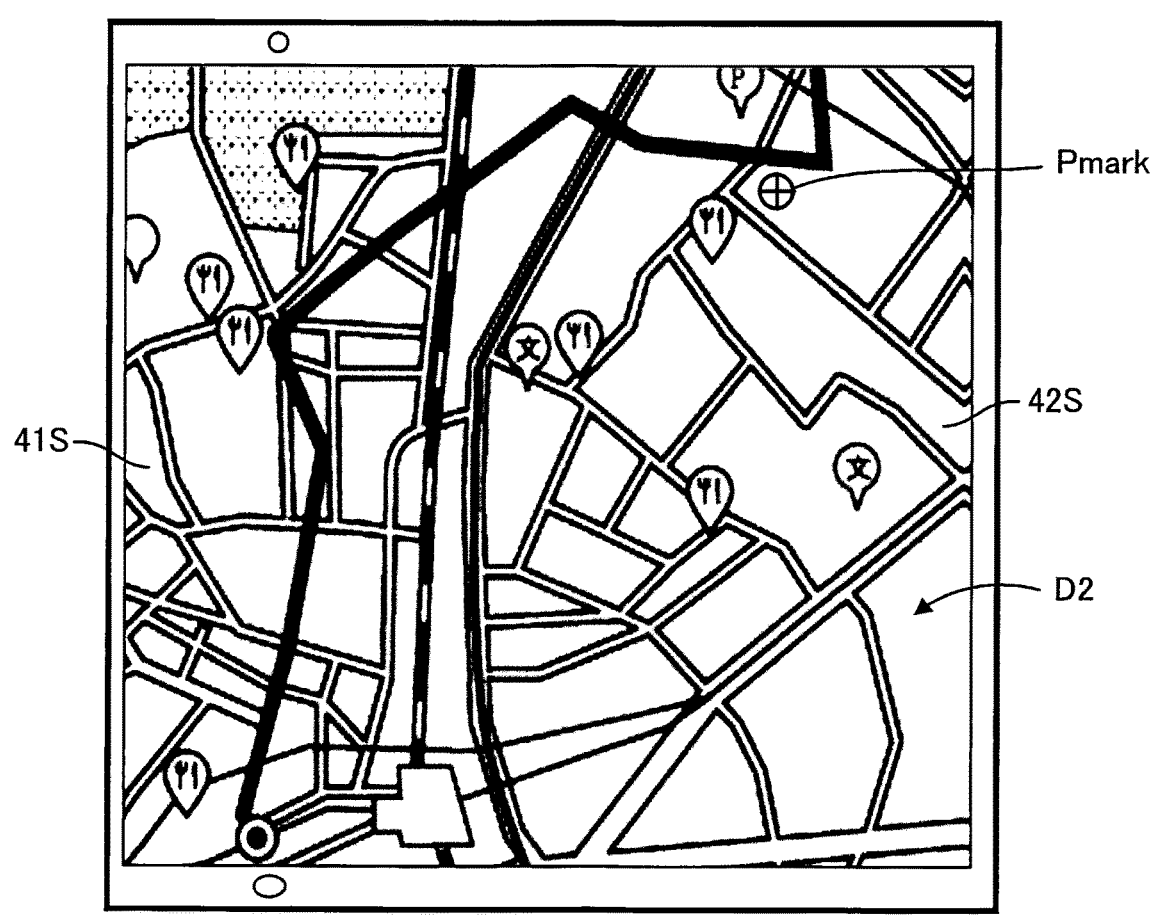

FIG. 6B is a diagram illustrating transition of a display screen of the information processing device in the first operation example.

Figure 6C:
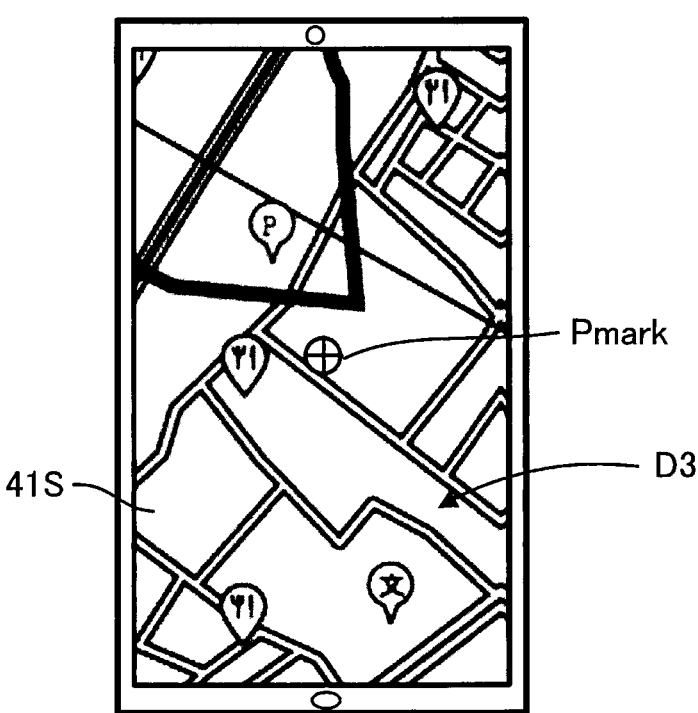

FIG. 6C is a diagram illustrating transition of a display screen of the information processing device in the first operation example.

Figure 7:
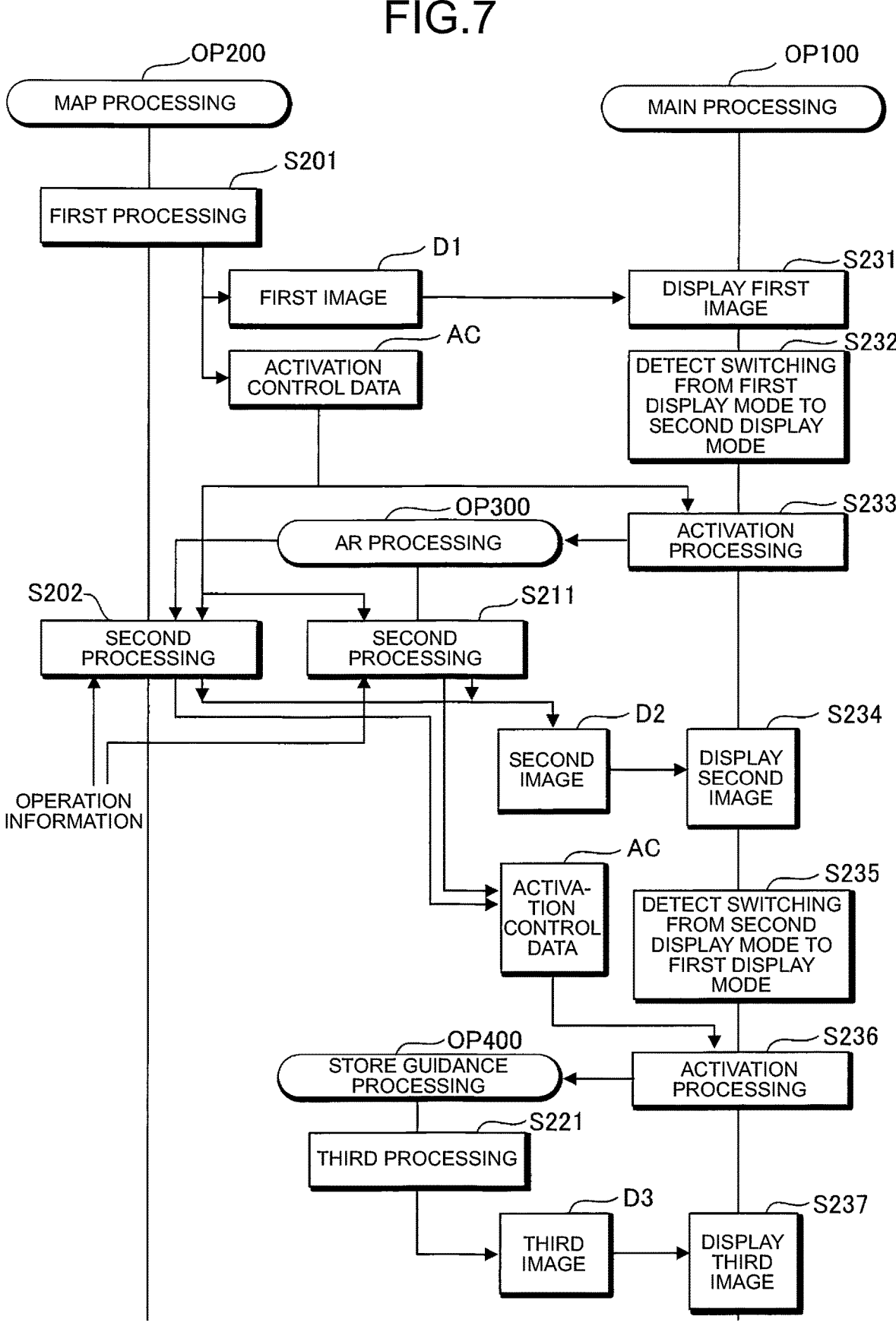

FIG. 7 is a sequence diagram illustrating a linkage among map processing, AR processing, store guidance processing, and main processing in a second operation example of the information processing device.

Figure 8A:
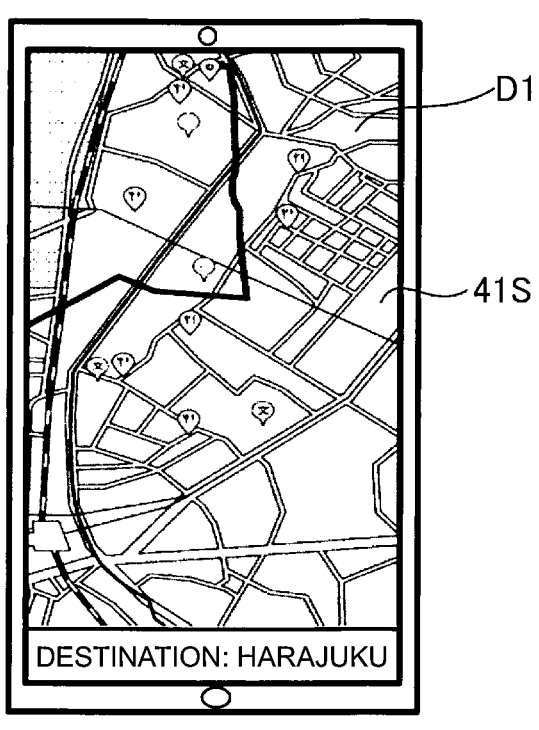

FIG. 8A is a diagram illustrating transition of a display screen of the information processing device in the second operation example.

Figure 8B:
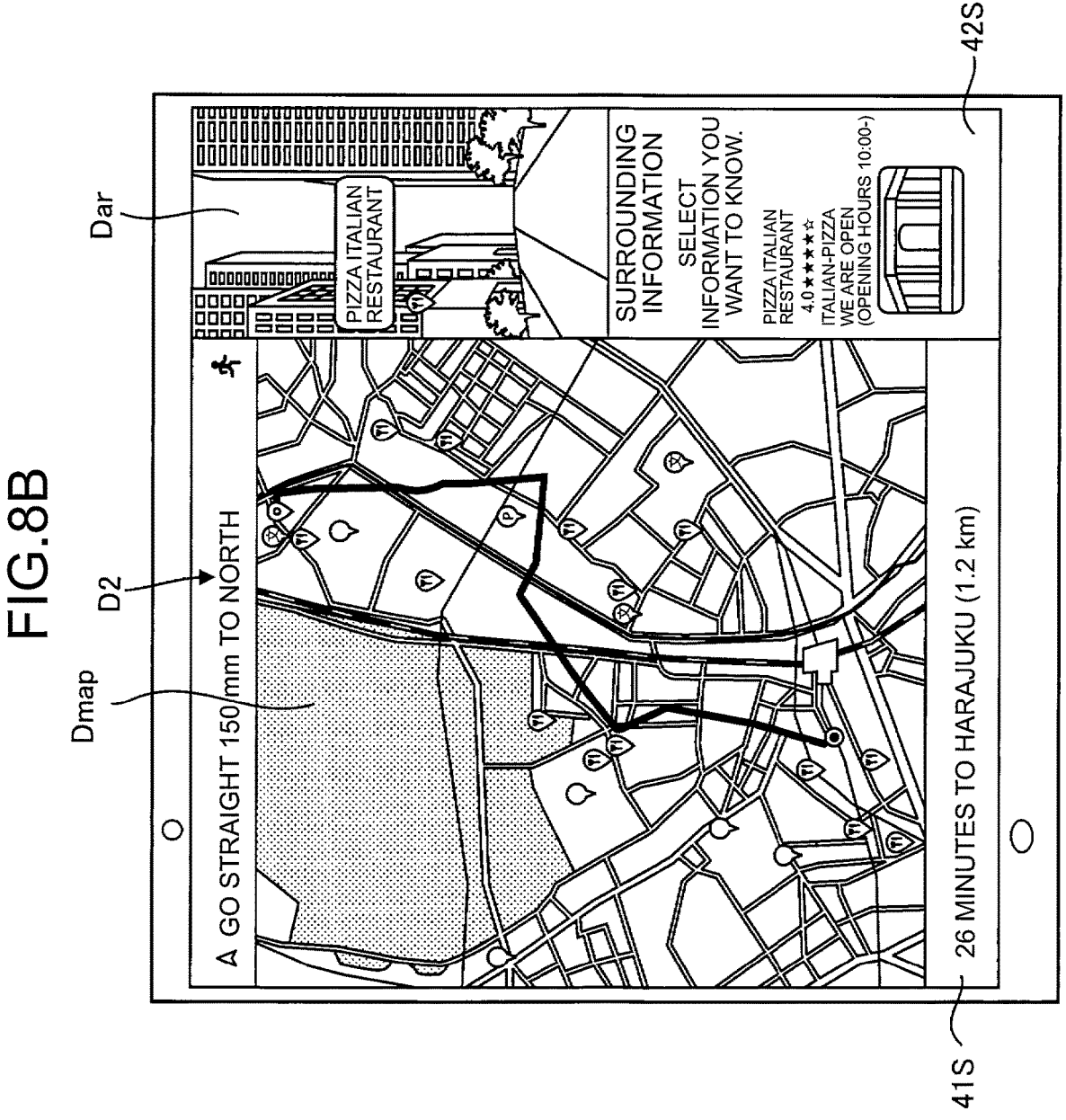

FIG. 8B is a diagram illustrating transition of the display screen of the information processing device in the second operation example.

Figure 8C:
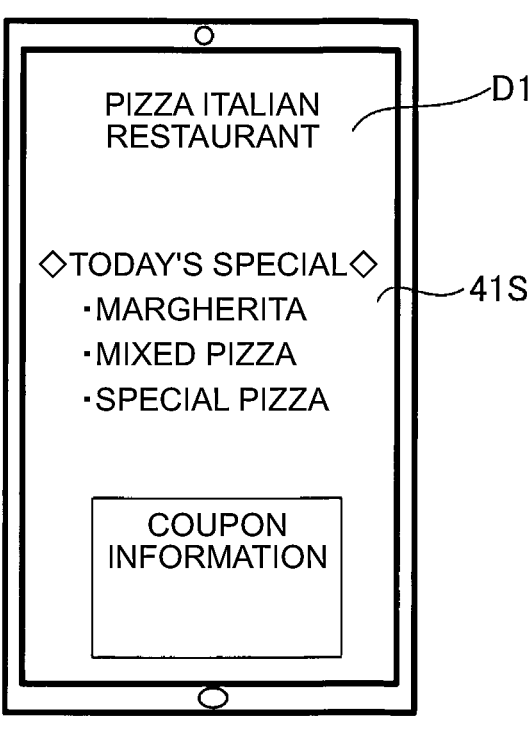

FIG. 8C is a diagram illustrating transition of a display screen of the information processing device in the second operation example.

FIG. 9 is a sequence diagram illustrating a linkage among electronic ticket processing, ground map processing, store guidance processing, and main processing in a third operation example of the information processing device.

Figure 10A:
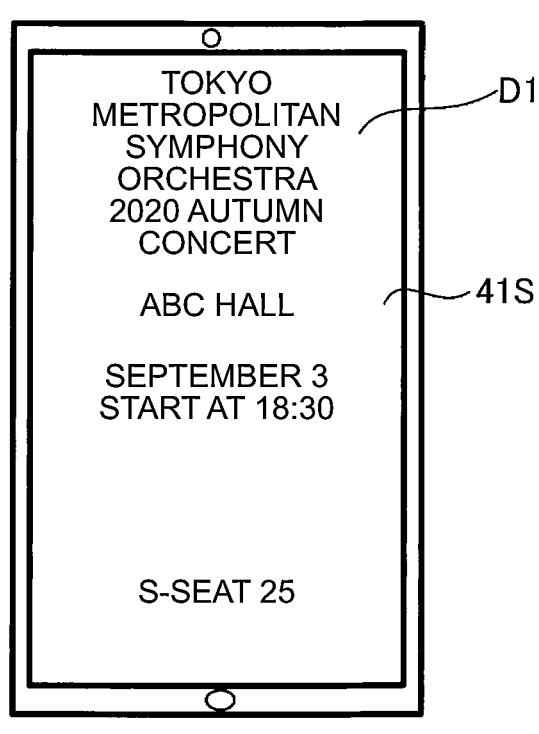

FIG. 10A is a view illustrating transition of a display screen of the information processing device in the third operation example.

Figure 10B:
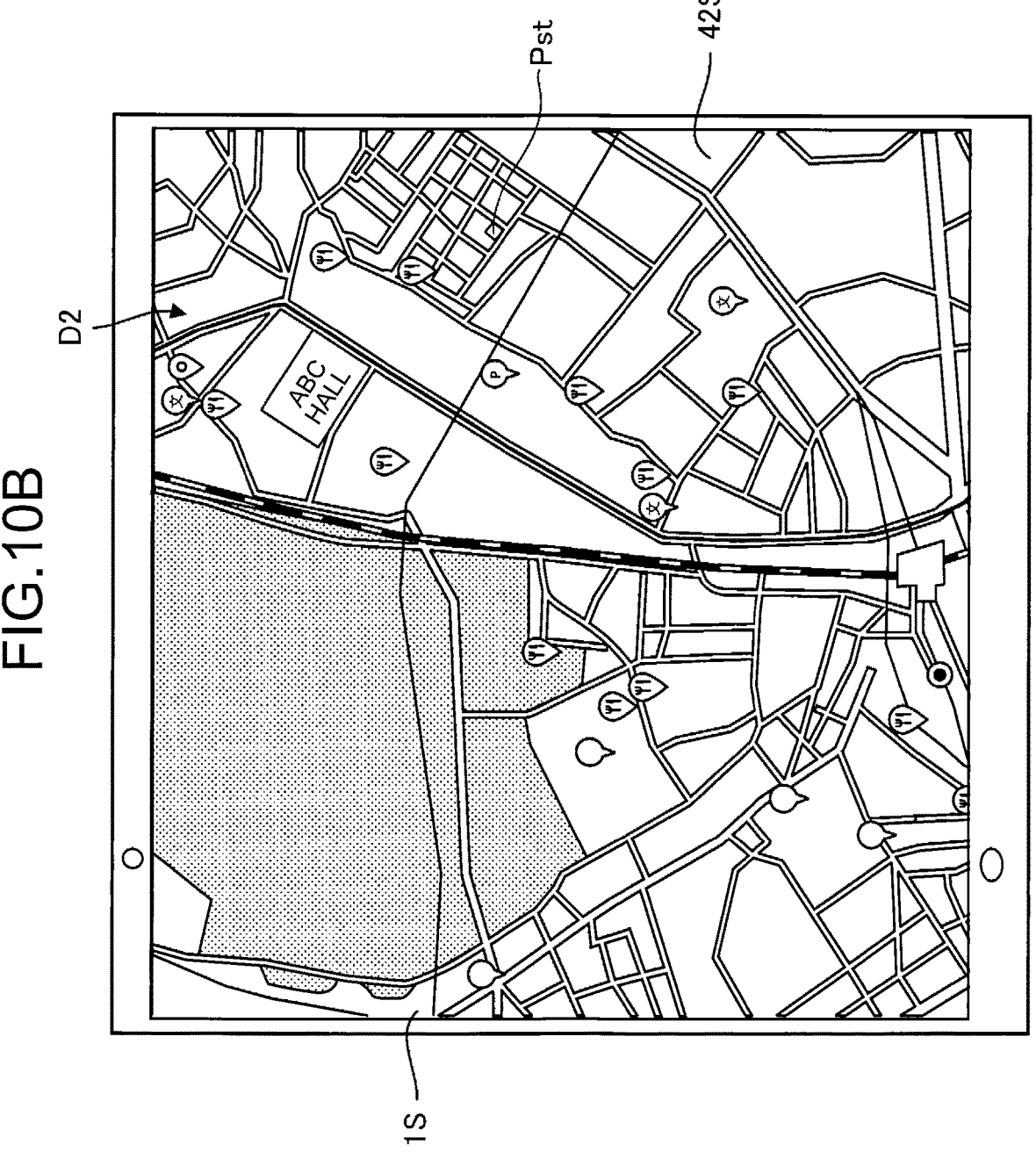

FIG. 10B is a diagram illustrating transition of the display screen of the information processing device in the third operation example.

Figure 10C:
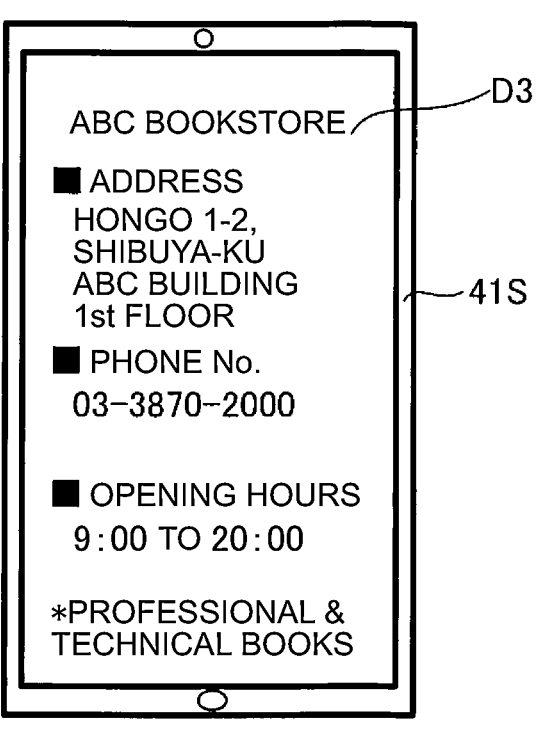

FIG. 10C is a view illustrating transition of a display screen of the information processing device in the third operation example.

Figure 11:
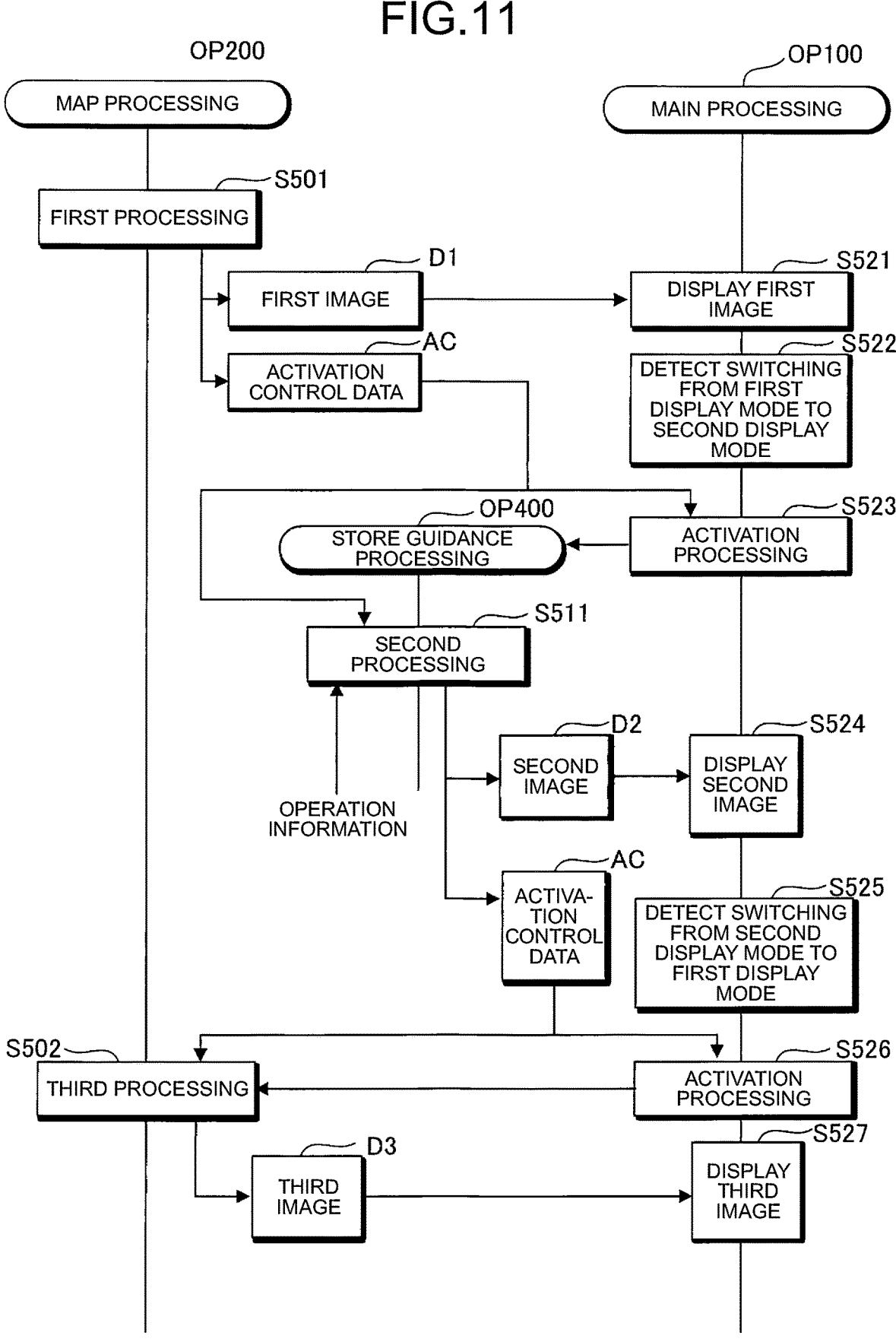

FIG. 11 is a sequence diagram illustrating a linkage among map processing, store guidance processing, and main processing in a fourth operation example of the information processing device.

Figure 12A:
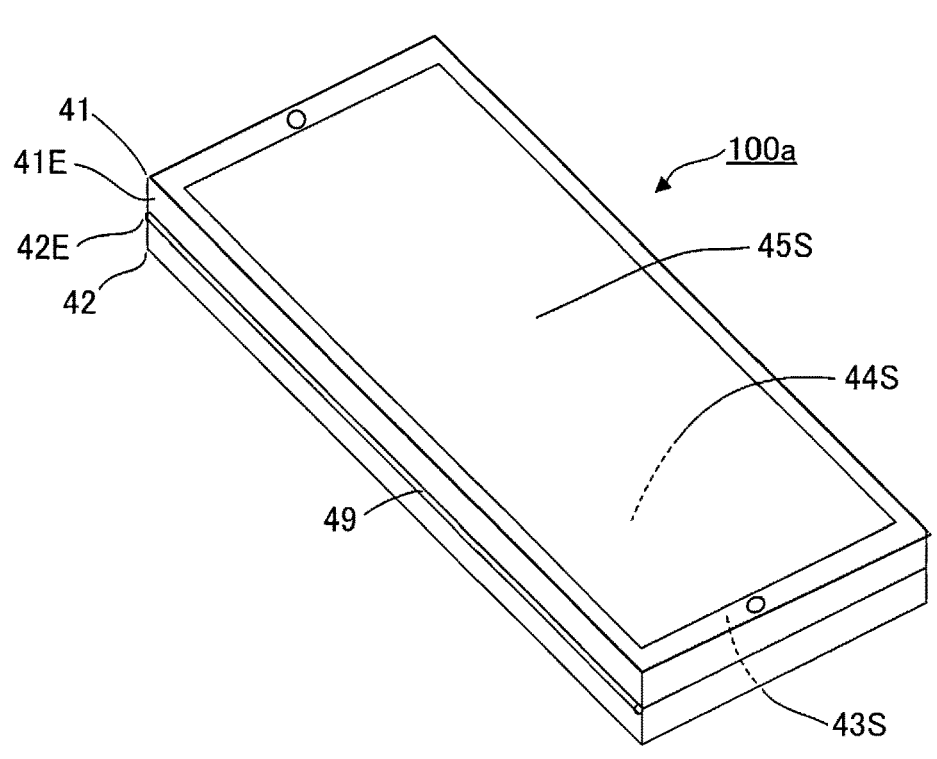

FIG. 12A is a perspective view illustrating an appearance of an information processing device in a first display mode according to a second embodiment of the present disclosure.

Figure 12B:
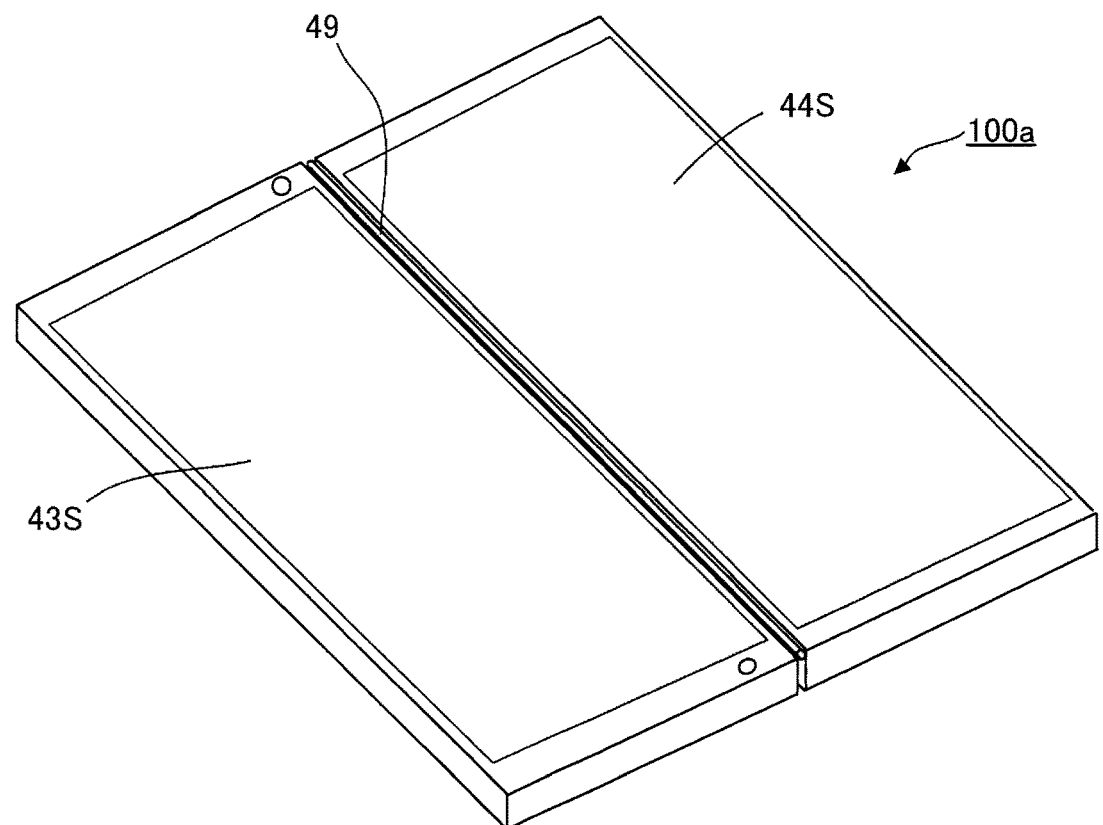

FIG. 12B is a perspective view illustrating an appearance of the information processing device in a second display mode.

Figure 13:
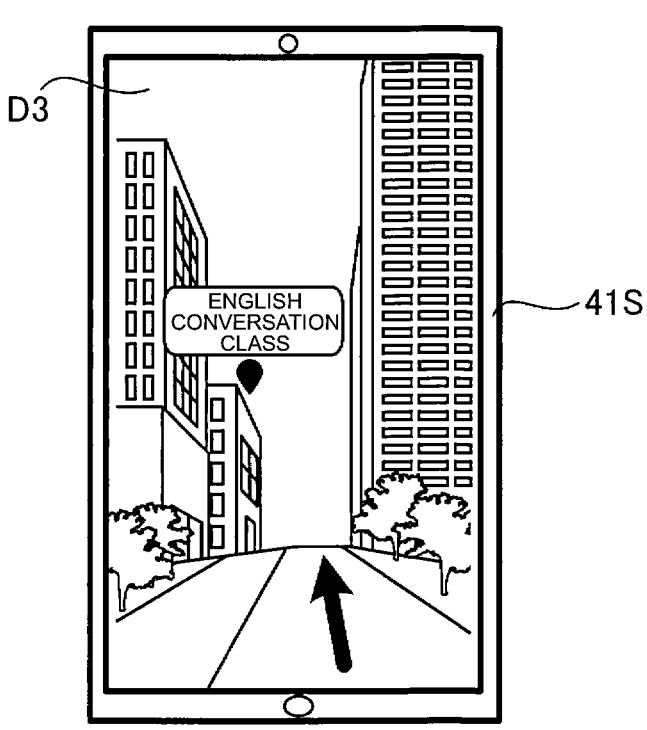

FIG. 13 is a diagram illustrating transition of a display screen of an information processing device according to a modification.

DESCRIPTION OF EMBODIMENTS

First Embodiment

Figure 1A:
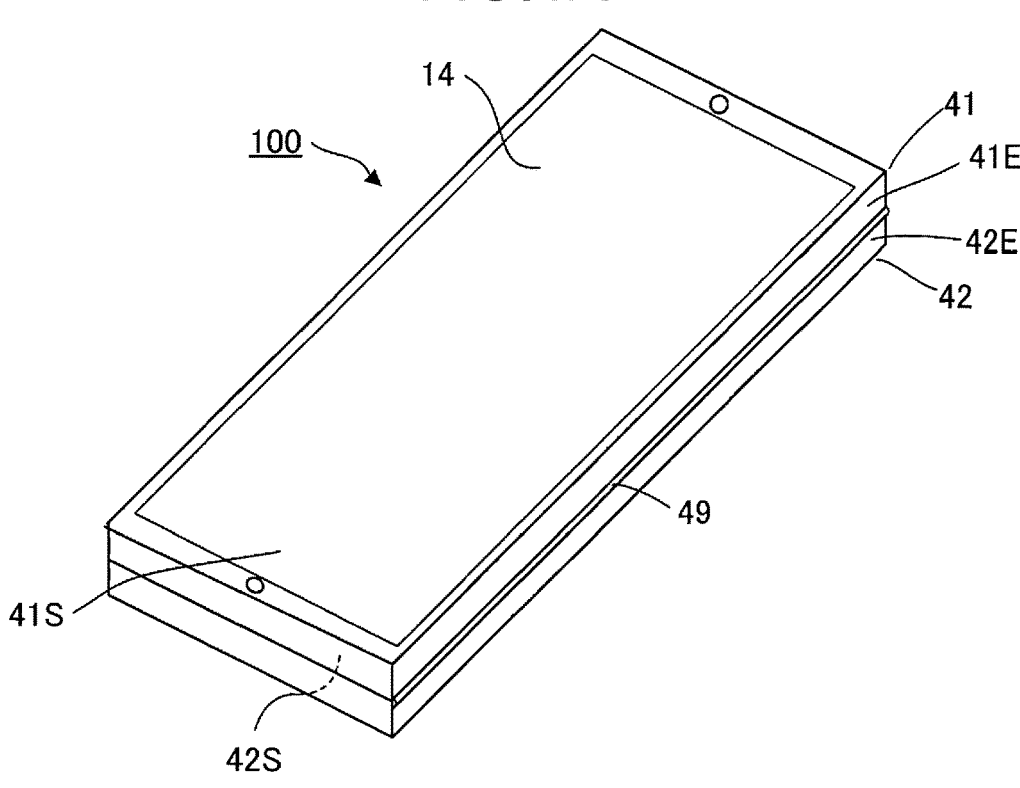
FIG. 1A is a perspective view illustrating an appearance of an information processing device in a first display mode according to a first embodiment of the present disclosure.
Figure 1B:
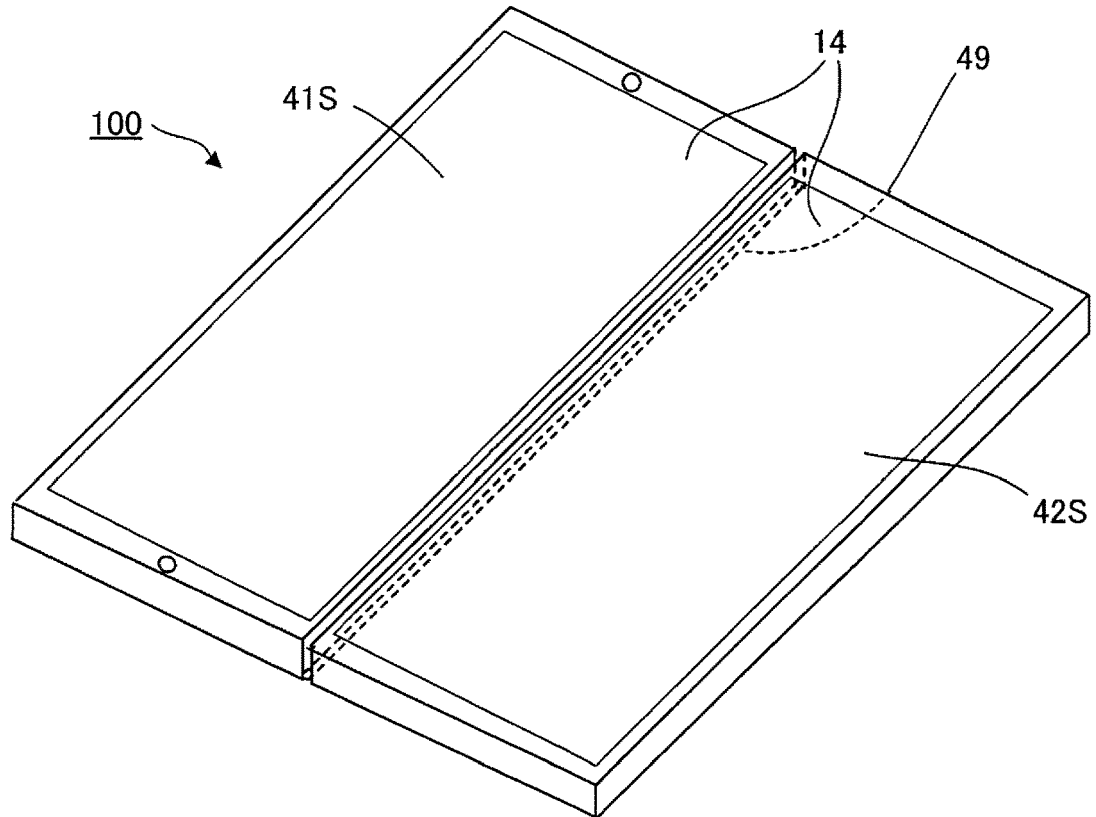
FIG. 1B is a perspective view illustrating an appearance of the information processing device in a second display mode.

FIGS. 1A and 1B are perspective views illustrating an appearance of an information processing device 100 according to a first embodiment of the present disclosure. The information processing device 100 in the present embodiment is a smartphone. The information processing device 100 may be a portable information processing device such as a mobile phone or a tablet terminal other than a smartphone.

As illustrated in FIGS. 1A and 1B, the information processing device 100 includes housings 41 and 42 and a hinge 49. Each of the housings 41 and 42 is a housing having a rectangular parallelepiped plate shape. The housing 41 has a display surface 41S having a rectangular shape on one of the two surfaces, namely, front and back surfaces, while the housing 42 has a display surface 42S having a rectangular shape on one of the two surfaces, namely, front and back surfaces. The display surfaces 41S and 42S are display surfaces of the display device 14 of the information processing device 100. In the present embodiment, the display surfaces 41S and 42S have the same display area.

Among four end surfaces, an end surface 41E is one of the two end surfaces on the long side of the two surfaces, namely, front and back surfaces, of the housing 41. Similarly, the housing 42 has four rectangular end surfaces surrounding their two surfaces, namely, front and back surfaces. Among four end surfaces, an end surface 42E is one of the two end surfaces on the long side of the two surfaces, namely, front and back surfaces, of the housing 42. The hinge 49 is a joint hinge that rotatably joints the housings 41 and 42 to each other. The hinge 49 joins a long side opposite to the long side facing the display surface 41S on the end surface 41E and a long side opposite to the long side facing the display surface 42S on the end surface 42E.

In the present embodiment, a hinge angle θ formed by the display surfaces 41S and 42S changes together with the rotation of the hinge 49. In the present embodiment, by setting the hinge angle θ to 360 degrees, as illustrated in FIG. 1A, the user can cause the display surfaces 41S and 42S to face outward to set the display mode of the display device of the information processing device 100 to a first display mode in which display is performed only on the display surface 41S. In addition, by setting the hinge angle θ to 180 degrees, the user can set the display surfaces 41S and 42S to face the user as illustrated in FIG. 1B. The user can set the display mode of the display device 14 of the information processing device 100 to a second display mode in which display is performed on both the display surfaces 41S and 42S. The second display mode is a display mode having a larger display area than the first display mode.

Figure 2:
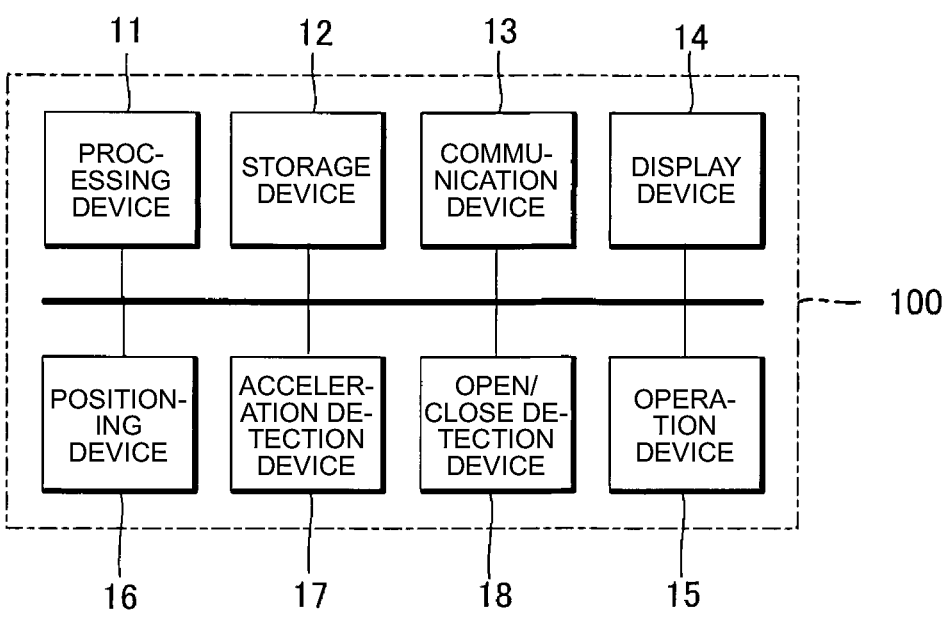
FIG. 2 is a block diagram illustrating a hardware configuration of the information processing device.

FIG. 2 is a block diagram illustrating a hardware configuration of the information processing device 100. As illustrated in FIG. 2, the information processing device 100 is a computer including a processing device 11, a storage device 12, a communication device 13, a display device 14, an operation device 15, a positioning device 16, an acceleration detection device 17, and an open/close detection device 18. The individual components of the information processing device 100 are mutually connected by a single or a plurality of buses. Note that the term "device" in the present application may be replaced with another term such as a circuit or a unit. Furthermore, each component of the information processing device 100 includes one or a plurality of devices, and some elements of the information processing device 100 may be omitted.

The processing device 11 is a processor that controls the entire information processing device 100, and includes, for example, one or a plurality of chips. The processing device 11 is constituted with a central processing unit (CPU) including devices such as an interface with a peripheral device, an arithmetic device, and a register. Some or all of the functions of the processing device 11 may be implemented by hardware devices such as a digital signal processor (DSP), an application specific integrated circuit (ASIC), a programmable logic device (PLD), or a field programmable gate array (FPGA). The processing device 11 executes various types of processing sequentially or in parallel.

The storage device 12 is a recording medium readable by the processing device 11, and stores a plurality of programs executed by the processing device 11 and various types of data used by the processing device 11. The storage device 12 includes, for example, a nonvolatile storage circuit such as read only memory (ROM), erasable programmable ROM (EPROM), or electrically erasable programmable ROM (EEPROM), and a volatile storage circuit such as random access memory (RAM).

The communication device 13 is a device that communicates with another device via a communication network such as a mobile communication network or the Internet. The communication device 13 is also described as a network device, a network controller, a network card, or a communication module, for example. For example, an application program received by the communication device 13 from a distribution server (not illustrated) via a communication network is stored in the storage device 12. Furthermore, the communication device 13 includes a wireless device that performs short-range wireless communication such as Bluetooth (registered trademark).

The display device 14 displays various images on the display surfaces 41S and 42S under the control of the processing device 11. For example, various display panels such as a liquid crystal display panel and an organic EL display panel are suitably used as the display device 14. The display device having the display surface 41S and the display device having the display surface 42S are display devices physically separate from each other. However, the information processing device 100 according to the present embodiment sometimes has a case where one image is displayed across the display surfaces 41S and 42S, or display by the display surface 41S and display by the display surface 42S are linked to execute single integrated processing. Accordingly, in the present embodiment, the display device having the display surface 41S and the display device having the display surface 42S are collectively handled as one display device 14.

The operation device 15 is a device for inputting information used by the information processing device 100. The operation device 15 receives user's operations. Specifically, the operation device 15 receives an operation for inputting symbols such as numbers and characters, and an operation for selecting an icon to be displayed on the display device 14. For example, a device suitable as the operation device 15 is a touch panel that detects contact with the display surface of the display device 14. Note that the operation device 15 may include a plurality of operators that can be operated by the user.

The positioning device 16 is specifically a GPS device, receives radio waves from a plurality of satellites, and generates position information from the received radio waves. The position information may have any format as long as the position can be specified. The position information indicates, for example, the latitude and longitude of the information processing device 100. Although the position information is obtained from the positioning device 16 in the example, the information processing device 100 may acquire the position information by any method. For example, the position information may be acquired using a cell ID allocated to a base station that is a communication destination of the information processing device 100. Furthermore, when the information processing device 100 communicates with an access point of a wireless LAN, the information processing device 100 may acquire the position information by referring to a database in which an identification address (MAC address) on a network assigned to the access point is associated with a physical address (position).

The acceleration detection device 17 is a device that detects acceleration working on the information processing device 100. The acceleration detection device 17 is implemented by using various acceleration sensors such as a piezo-resistive sensor or a capacitive sensor. The open/close detection device 18 is a device that detects a display mode of the display device 14. Specifically, the open/close detection device 18 includes a sensor that detects an angle formed by the display surfaces 41S and 42S, that is, the hinge angle θ of the hinge 49, and outputs a detection signal having a strength corresponding to the hinge angle θ. When the hinge angle θ indicated by the detection signal is within a range of $360°<θ<270°$, for example, the open/close detection device 18 outputs a signal indicating that the display mode of the display device 14 is the first display mode (closed state). When the hinge angle θ indicated by the detection signal is within a range of $270°<θ<90°$, for example, the open/close detection device 18 outputs a signal indicating that the display mode of the display device 14 is the second display mode (open state).

Figure 3A:
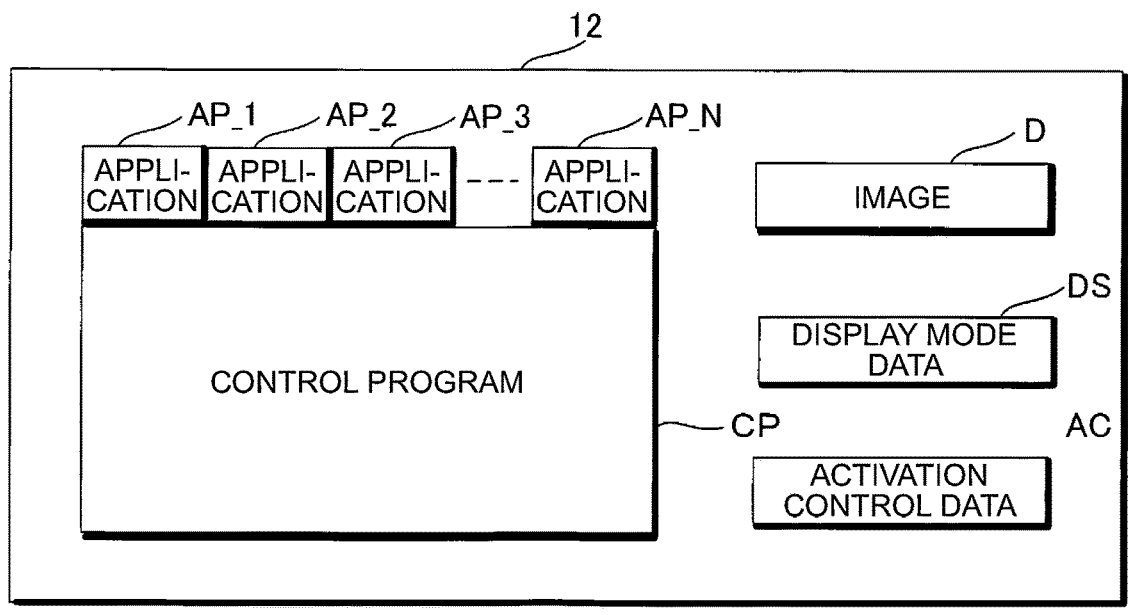
FIG. 3A is a diagram illustrating content stored in a storage device of the information processing device.

FIG. 3A is a diagram illustrating content stored in the storage device 12. As illustrated in FIG. 3A, the storage device 12 stores various application programs (hereinafter, it is abbreviated as an application) AP_1 to AP_N (N is an integer of 2 or more) forming an upper layer and a control program CP forming a lower layer. Here, the applications AP_1 to AP_N may be written in the storage device 12 at the time of factory shipment of the information processing device 100, or may be downloaded to the storage device 12 via the communication device 13, for example.

In addition, the storage device 12 stores display mode data DS, an image D, and activation control data AC. The display mode data DS indicates whether the current display mode of the display device 14 is the first display mode or the second display mode. The image D is an image to be displayed on the display device 14, and is generated by the processing device 11. The image D includes: a first image D1 or a third image D3 which are displayed when the display mode of the display device 14 is the first display mode; and a second image D2 which is displayed when the display mode of the display device 14 is the second display mode.

The activation control data AC includes designation data and parameters. The designation data designates processing to be activated by the processing device 11 after display switching when the display mode of the display device 14 is switched from the first display mode to the second display mode or switched from the second display mode to the first display mode. The designation data is an example of information that designates processing to be activated by the processing device 11 after display switching. The parameter is data used for processing to be activated by the processing device 11 after display switching.

Every time the execution mode of the application changes during execution of a certain application among the applications AP_1 to AP_N, the processing device 11 stores the activation control data AC in the storage device 12 in preparation for display switching to be performed thereafter. The processing to be activated may be head processing among the all processing based on the application, or may be intermediate processing. In a case where the processing to be activated is the head processing, the designation data designates, for example, the storage address of the first command in a storage region in which the application is stored.

In a case where the processing to be started is processing in the middle, the designation data designates, for example, a storage address of the first command corresponding to the processing in the middle of the storage region in which the application is stored.

In addition, the processing to be started may be the processing based on an application different from the application being executed by the processing device 11 at the time when the processing device 11 stores the activation control data AC in the storage device 12, or may be the processing other than the currently executed processing among all the processing based on the currently executed application. Specifically, the designation data that designates the processing to be activated indicates the storage address of the first command among the commands constituting the processing stored in the storage device 12. By executing the control program CP, the processing device 11 refers to the activation control data AC last stored in the storage device 12 in the period before the display switching at the timing when the display switching is performed, and activates the processing designated by the activation control data AC. The parameters included in the activation control data AC are referred to by the processing device 11 that executes the activated processing.

Figure 3B:
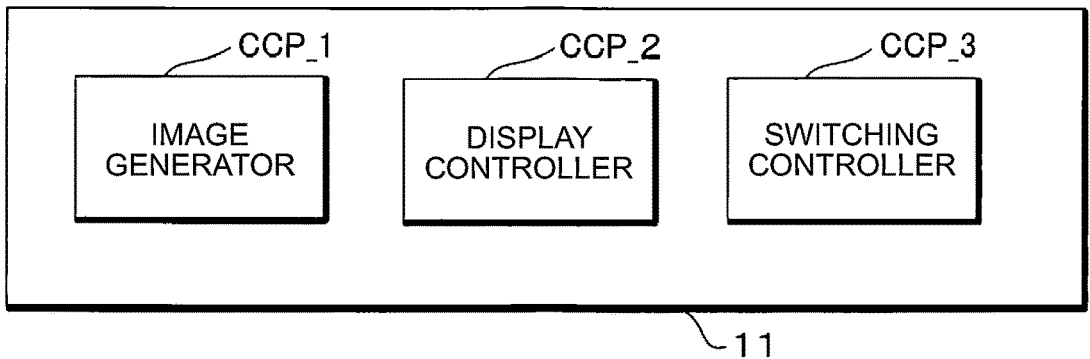
FIG. 3B is a block diagram illustrating a functional configuration of the information processing device.

FIG. 3B is a block diagram illustrating a functional configuration of the processing device 11. The processing device 11 reads the control program CP and the applications AP_1 to AP_N from the storage device 12. The processing device 11 is an execution unit that executes the read control program CP and the applications AP_1 to AP_N.

Figure 3C:
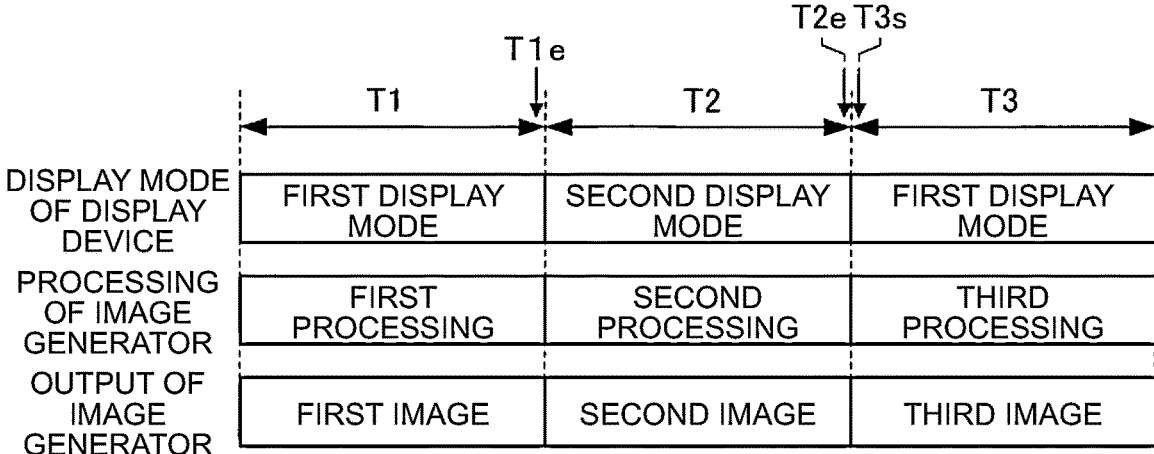
FIG. 3C is a time chart illustrating switching of processing accompanying display switching of the information processing device.

By executing a certain application among the applications AP_1 to AP_N, the processing device 11 functions as an image generator CCP_1. FIG. 3C is a time chart illustrating switching of processing accompanying display switching performed in the present embodiment. In the operation example illustrated in FIG. 3C, the display mode of the display device 14 is the first display mode over a first period T1, transitions to the second display mode over a subsequent period, namely, a second period T2, and transitions to the first display mode for the subsequent period, namely, a third period T3. In this case, the image generator CCP_1 generates the first image D1 by the first processing executed over the first period T1, generates the second image D2 by the second processing executed over the second period T2, and generates the third image D3 by the third processing executed over the third period T3. Here, the image generator CCP_1 executes the first processing, the second processing, and the third processing by executing any one or more of the applications AP_1 to AP_N.

In addition, by executing the control program CP, the processing device 11 functions as a display controller CCP_2. The display controller CCP_2 causes the display device 14 to display the first image D1 generated by the first processing executed over the first period T1, causes the display device 14 to display the second image D2 generated by the second processing executed over the second period T2, and causes the display device 14 to display the third image D3 generated by the third processing executed over the third period T3.

In the present embodiment, the image displayed on the display device 14 at an end point T2e of the second period T2 in the second image D2 is different from the image displayed on the display device 14 at an end point T1e of the first period T1 in the first image D1. The image displayed on the display device 14 at a start point T3s of third period T3 in third image D3 is different from the image displayed on the display device 14 at the end point T1e of the first period T1 in the first image D1. The image displayed on the display device 14 at the start point T3s of third period T3 in third image D3 is different from the image displayed on the display device 14 at the end point T2e of the second period T2 in the second image. In the present embodiment, the third processing uses the result of the second processing. The result of the second processing is a parameter included in the activation control data AC.

In addition, the processing device 11 functions as a switching controller CCP_3 by executing the control program CP. When the display mode is switched, the switching controller CCP_3 refers to the activation control data AC last stored in the storage device 12 within a period before the switching. The processing device 11 activates the processing designated by the information included in the activation control data AC as the processing of the image generator CCP_1. The processing device 11 then refers to the parameter included in the activation control data AC when executing the processing designated by the activation control data AC. Therefore, in the present embodiment, the activation control data AC associates the second processing with the result of the first processing, and associates the third processing with the result of the second processing.

Operation of First Embodiment

Figure 4:
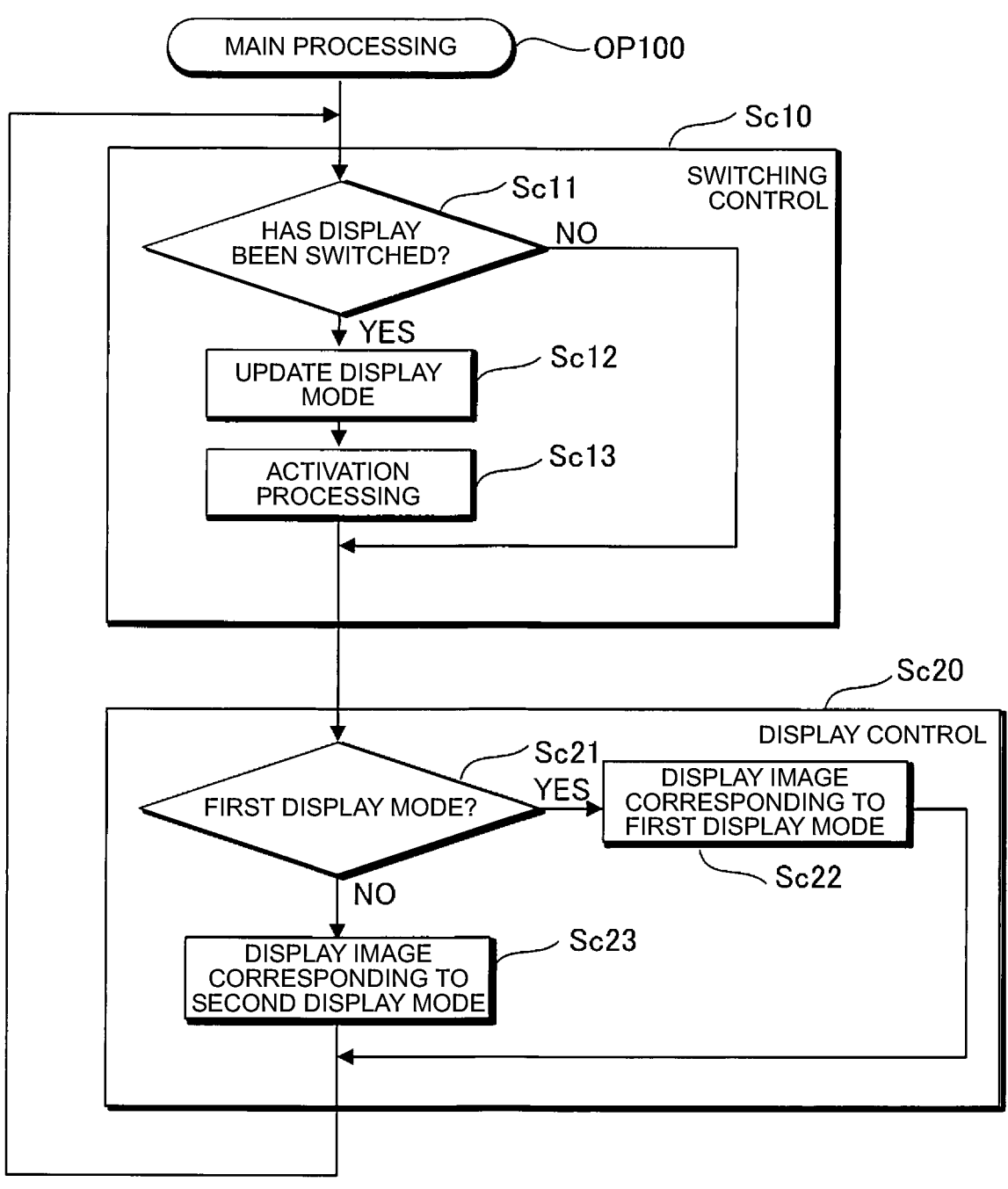
FIG. 4 is a flowchart illustrating a flow of main processing executed following a control program by a processing device of the information processing device.

Next, the operation of the present embodiment will be described. FIG. 4 is a flowchart illustrating a flow of main processing OP100 executed by the processing device 11 according to the control program CP in the present embodiment. In the present embodiment, when the information processing device 100 is powered on, the processing device 11 executes the control program CP. In the execution of the control program CP, the processing device 11 repeats switching control (step Sc10), which is processing as the switching controller CCP_3, and display control (step Sc20), which is processing as the display controller CCP_2.

In the switching control (step Sc10), based on an output signal of the open/close detection device 18, the processing device 11 determines whether display switching, specifically, the switching from the first display mode to the second display mode or switching from the second display mode to the first display mode, has been performed (step Sc11). In a case where the determination result of step Sc11 is negative, the processing device 11 ends the switching control (step Sc10) and proceeds with the processing to the display control (step Sc20).

In contrast, when the determination result of step Sc11 is affirmative, the processing of updating the display mode, specifically, storing the display mode data DS indicating the display mode detected in step Sc11 in the storage device 12, is executed (step Sc12).

Next, the processing device 11 executes activation processing (step Sc13). In this activation processing, the processing device 11 refers to the activation control data AC stored in the storage device 12 and activates the processing designated by the activation control data AC. When the processing of step Sc13 ends, the processing device 11 ends the switching control (step Sc10) and proceeds with the processing to the display control (step Sc20).

Next, in the display control (step Sc20), the processing device 11 determines whether the display mode data DS in the storage device 12 indicates the first display mode (step Sc21). When the determination result is affirmative, the processing device 11 displays an image D stored in the storage device 12 on the display device 14 in the first display mode (step Sc22), and ends the display control (step Sc20).

Here, when the display mode of the display device 14 is the first display mode, the first image D1 or the third image D3 is stored in the storage device 12 as the image D. Accordingly, in step Sc22, the first image D1 or the third image D3 is displayed on the display device 14.

In a case where the display mode of the display device 14 is the second display mode, the determination result of step Sc21 is negative. In this case, the processing device 11 causes the display device 14 in the second display mode to display the image D stored in the storage device 12 (step Sc23), and then ends the display control (step Sc20). Here, when the display mode of the display device 14 is the second display mode, the second image D2 is stored in the storage device 12 as the image D. Therefore, in step Sc23, the second image D2 is displayed on the display device 14.

When the display control (step Sc20) ends, the processing device 11 returns the processing to the switching control (step Sc10). The processing device 11 repeats the execution of the switching control (step Sc10) and the display control (step Sc20).

In the present embodiment, the processing device 11 executes the control program CP as described above and a certain application among the applications AP_1 to AP_N, thereby implementing various operations involving switching from the first display mode to the second display mode and switching from the second display mode to the first display mode.

First Operation Example of First Embodiment

FIG. 5 is a sequence diagram illustrating a linkage between map processing OP200 executed by the processing device 11 in accordance with the map application AP_1 and the main processing OP100 executed in accordance with the control program CP in the first operation example of the present embodiment. FIGS. 6A, 6B, and 6C are diagrams illustrating transition of the display screen of the display device 14 in the first operation example.

In the first operation example, the processing device 11 executes the map application AP_1, which is one of the applications AP_1 to AP_N, and the control program CP. When the map application AP_1 is executed, the processing device 11 executes the map processing OP200. When the control program CP is executed, the processing device 11 executes the main processing OP100.

In the first operation example, the display device 14 is in the first display mode in the initial state, and the period is the first period T1. In the first operation example, the processing device 11 executes the first processing based on the map processing OP200 over the first period T1 (step S101). In the first processing, the processing device 11 functions as the image generator CCP_1. The processing device 11 generates the first image D1 that is a map image in accordance with an operation on the operation device 15, and stores the generated first image D1 as the image D in the storage device 12.

On the other hand, in step S111 of the main processing OP100, the processing device 11 functions as the display controller CCP_2. The processing device 11 causes the display device 14 in the first display mode to display the image D stored in the storage device 12, that is, the first image D1. FIG. 6A illustrates the first image D1 displayed on the display surface 41S of the display device 14 at this time.

By executing processing corresponding to an operation on the operation device 15, the processing device 11 stores the activation control data AC in the storage device 12 every time the execution mode of the first processing (step S101)

of the map processing OP200 changes, for example. In the first operation example, the activation control data AC stored last in the storage device 12 within the first period T1 includes designation data that designates the second processing (step S102) of the map processing OP200 and parameters (for example, the latitude and longitude of the center position in the map) indicating the center position of the map currently displayed.

When the display mode of the display device 14 is switched from the first display mode to the second display mode, the processing device 11 functions as the switching controller CCP_3 in step S112 of the main processing OP100. When having detected the switching, the processing device 11 stores the display mode data DS indicating the second display mode in the storage device 12.

Next, in step S113 of the main processing OP100, the processing device 11 functions as the switching controller CCP_3. The processing device 11 activates the second processing (step S102) based on the map processing OP200 according to the activation control data AC in the storage device 12. This ends the first period T1 and starts the second period T2.

The processing device 11 as the image generator CCP_1 executes the second processing in step S102 of the map processing OP200. In the first operation example, the second processing is processing of enlarging a map image. In this second processing, the processing device 11 generates the second image D2 that is a map image having an image size corresponding to the second display mode. The processing device 11 stores the generated second image D2 as the image D in the storage device 12. At that time, the processing device 11 generates the second image D2 by scrolling the map image such that the position indicated by the parameter in the activation control data AC in the second image D2 is displayed at the center of the display surface in the second display mode.

On the other hand, in step S114 of the main processing OP100, the processing device 11 functions as the display controller CCP_2. The processing device 11 causes the display device 14 in the second display mode to display the image D in the storage device 12, that is, the second image D2.

In the first operation example, during the execution of the second processing (step S102) of the map processing OP200, the user operates the operation device 15 to instruct a position Pmark as a desired position in the second image D2 currently displayed. FIG. 6B illustrates the second image D2 displayed on the display device 14 by the processing in step S114 executed at this time. The processing device 11 as the image generator CCP_1 generates the activation control data AC in accordance with the instruction of the position Pmark and stores the generated activation control data AC in the storage device 12. In the first operation example, the activation control data AC is the activation control data AC stored in the storage device 12 last in the second period T2. The activation control data AC includes designation data that designates the third processing (step S103) in the map processing OP200 and a parameter indicating the position Pmark instructed by the user (for example, the latitude and longitude of the position Pmark on the map).

When the display mode of the display device 14 is switched from the second display mode to the first display mode, the processing device 11 functions as the switching controller CCP_3 in step S115 of the main processing OP100. When having detected the switching, the processing device 11 stores the display mode data DS indicating the first display mode in the storage device 12.

Next, in step S116 of the main processing OP100, the processing device 11 functions as the switching controller CCP_3. The processing device 11 activates the third processing (step S103) in the map processing OP200 according to the activation control data AC in the storage device 12. This ends the second period T2 and starts the third period T3.

The processing device 11 as the image generator CCP_1 executes the third processing in step S103 of the map processing OP200. The third processing is processing of displaying an image of a normal size. In the third processing, the processing device 11 generates the third image D3, which is a map image having an image size corresponding to the first display mode, and stores the generated third image D3 in the storage device 12. At that time, the processing device 11 generates the third image D3 by scrolling the map image such that the position indicated by the parameter in the activation control data AC is displayed at the center of the display surface 41S in the first display mode.

On the other hand, in step S117 of the main processing OP100, the processing device 11 functions as the display controller CCP_2. The processing device 11 causes the display device 14 in the first display mode to display the image D in the storage device 12, that is, the third image D3. FIG. 6C illustrates the third image D3 displayed on the display device 14 at this time. As can be seen from comparison between FIGS. 6B and 6C, in the first operation example, when the position Pmark as a desired position on the enlarged map image, which is the second image D2, is instructed during the second period T2, a map image scrolled so that the instructed position Pmark is located at the center of the display surface is displayed as the third image D3 during the third period T3.

As described above, in the first operation example, the processing device 11 as the image generator CCP_1 executes the first processing (step S101) and the third processing (step S103) using the map application AP_1 which is an example of the first application program, determines the parameter (position Pmark) based on the result of the second processing (step S102), and executes, in the third processing (step S103), the map application AP_1 using the determined parameter.

In the first operation example, the third image D3 (refer to FIG. 6C) displayed at the start point T3s of the third period T3 is generated based on the result of the second processing (step S102). Therefore, the third image D3 is allowed to have a correlation with the second image D2 (refer to FIG. 6B) displayed at the end point T2e of the second period T2. In addition, the third image D3 is different from the image displayed at the end point T1e of the first period T1 (refer to FIG. 6A), making it possible to provide new information to the user. As a result, the convenience of the information processing device 100 is improved as compared with the case where the same image as the end point T1e of the first period T1 is displayed on the display device 14 at the start point T3s of the third period T3.

Second Operation Example of First Embodiment

FIG. 7 is a sequence diagram illustrating a linkage among map processing OP200, AR processing OP300, store guidance processing OP400, and the main processing OP100 executed in the second operation example. FIGS. 8A, 8B, and 8C are diagrams illustrating transition of the display screen of the display device 14 in the second operation example.

In the second operation example, the processing device 11 executes a map application AP_1, an AR application AP_2, and a store guidance application AP_3, which are individual applications of the applications AP_1 to AP_N, and a control program CP.

When the map application AP_1 is executed, the processing device 11 executes the map processing OP200 illustrated in FIG. 7. Furthermore, when the AR application AP_2 is executed, the processing device 11 executes the AR processing OP300 illustrated in FIG. 7. Here, AR is an abbreviation of augmented reality, representing a technology of adding, reducing, or changing information given to perception such as vision from a real environment by processing by a computer. AR includes a technology of generating an image indicating the environment of a walking user by adding an image of a building or the like around the current position of the user when the current position of the user is obtained by positioning. When the store guidance application AP_3 is executed, the processing device 11 executes the store guidance processing OP400 illustrated in FIG. 7. When the control program CP is executed, the processing device 11 executes the main processing OP100 illustrated in FIG. 7.

In the second operation example, the processing device 11 executes the first processing in step S201 of the map processing OP200. In a first period T1 in which the first processing is continued, the processing device 11 generates the first image D1 being a map image according to an operation on the operation device 15. In the second operation example, in the process of executing the first processing, the processing device 11 receives a route search request from the user. Therefore, the processing device 11 executes route search, generates the first image D1 being a map image indicating the result of the route search, and stores the generated first image D1 in the storage device 12 as the image D.

On the other hand, in step S231 of the main processing OP100, the processing device 11 functions as the display controller CCP_2. The processing device 11 causes the display device 14 in the first display mode to display the image D in the storage device 12, that is, the first image D1. FIG. 8A illustrates an example of first image D1 displayed on the display surface 41S of the display device 14. In the example illustrated in FIG. 8A, a map image illustrating a route to the destination Harajuku obtained by the route search of the first processing (step S201) is displayed on the display surface 41S as the first image D1. In this example, since the size of the map image that can be displayed on the display surface 41S is small, only a part of the searched routes is displayed on the display surface 41S.

By operations such as executing the processing according to the request from the user, the processing device 11 stores the activation control data AC in the storage device 12 every time the execution mode of the first processing changes. In the second operation example, the activation control data AC last stored in the storage device 12 within the first period T1 includes designation data that designates the second processing (step S202) of the map processing OP200, designation data that designates the AR processing OP300 based on the AR application AP_2, and a parameter indicating a route obtained by the route search of the first processing (step S201).

When the display mode of the display device 14 is switched from the first display mode to the second display mode, the processing device 11 functions as the switching controller CCP_3 in step S232 of the main processing OP100. In the case where the processing device 11 has detected this switching, the processing device 11 stores the display mode data DS indicating the second display mode in the storage device 12.

Next, in step S233 of the main processing OP100, the processing device 11 functions as the switching controller CCP_3. The processing device 11 activates the second processing (step S202) of the map processing OP200 and the AR processing OP300 based on the AR application AP_2 in accordance with the activation control data AC in the storage device 12.

The switching of the display mode of the display device 14 ends the first period T1 and starts the second period T2. The processing device 11 as the image generator CCP_1 executes the second processing in step S202 of the map processing OP200. In parallel with this, the processing device 11 as the image generator CCP_1 executes the AR processing OP300 and executes the second processing in step S211.

In the second processing of step S202, the processing device 11 refers to the parameter included in the activation control data AC in the storage device 12, and generates a map image in which the route indicated by the parameter can be confirmed, as a part of the second image D2. Furthermore, in the second processing of step S211, the processing device 11 refers to the parameter included in the activation control data AC in the storage device 12, searches for stores around the route indicated by the parameter, and generates an AR image including the image of the searched store, as the remaining part of the second image D2. More specifically, the processing device 11 obtains the current position of the user by the positioning device 16, and generates an AR image including an image of a store at a position closest to the current position of the user among stores around the route indicated by the parameter. Subsequently, the processing device 11 generates a second image D2 including the image generated in step S202 and the image generated in step S211, and stores the generated second image D2 in the storage device 12 as the image D.

On the other hand, in step S234 of the main processing OP100, the processing device 11 functions as the display controller CCP_2. The processing device 11 causes the display device 14 in the second display mode to display the image D in the storage device 12, that is, the second image D2. FIG. 8B illustrates the second image D2 displayed on the display device 14 at this time. As illustrated in FIG. 8B, the second image D2 includes a map image Dmap generated by the map processing OP200 and an AR image Dar generated by the AR processing OP300. Here, the AR image Dar includes a 3D image of a building such as a store viewed from the current position of the user. The AR image Dar is an image in which information indicating the store, an image of characters "Pizza Italian restaurant" in the illustrated example, is superimposed on a portion of the image indicating the store in the 3D image. Note that the AR image Dar is not limited to the 3D image of a building such as a store seen from the current position of the user. The AR image Dar may be an image in which characters indicating description of a target are superimposed on a street view image near the target, for example. In this case, a street view image near the target is acquired via the Internet.

By instructing, by the user, a desired position in the map image Dmap or the AR image Dar displayed on the display device 14 using the operation device 15, it is possible for the user to request the information processing device 100 to provide information regarding the store at the instructed position. The desired position may be a position on the map image Dmap or a position on the AR image Dar. When the user has performed an operation of instructing a desired position on the map image Dmap, the processing device 11 specifies a store corresponding to the instructed position in the second processing of step S202. The processing device 11 generates the activation control data AC including the designation data that designates the store guidance processing OP400 based on the store guidance application AP_3 and including the parameter indicating the specified store. The processing device 11 stores the generated activation control data AC in the storage device 12. Furthermore, when the user has instructed a desired position on the AR image Dar, the processing device 11 generates similar activation control data AC in the second processing of step S211. The processing device 11 stores the generated activation control data AC in the storage device 12.

When the display mode of the display device 14 is switched from the second display mode to the first display mode, the processing device 11 as the switching controller CCP_3 detects the switching in step S235 of the main processing OP100, and then, stores the display mode data DS indicating the first display mode in the storage device 12.

Next, in step 236 of the main processing OP100, the processing device 11 functions as the switching controller CCP_3. The processing device 11 activates the store guidance processing OP400 based on the store guidance application AP_3 according to the activation control data AC in the storage device 12. This ends the second period T2 and starts the third period T3.

The processing device 11 as the image generator CCP_1 executes the third processing in step S221 of the store guidance processing OP400. In the third processing, the processing device 11 generates the third image D3, which is a store guidance image having an image size corresponding to the first display mode, and stores the generated third image D3 in the storage device 12 as the image D. At that time, the processing device 11 generates a guidance image regarding the store specified by the parameter included in the activation control data AC, as the third image D3.

On the other hand, in step S237 of the main processing OP100, the processing device 11 as the display controller CCP_2 causes the display device 14 in the first display mode to display the image D in the storage device 12, namely, the third image D3. FIG. 8C illustrates an example of the third image D3 displayed on the display device 14 at this time. In this example, the user instructs the image of the pizza Italian restaurant in the AR image Dar illustrated in FIG. 8B, and the activation control data AC including the parameter indicating the pizza Italian restaurant is stored in the storage device 12 (step S211) in the second processing of step S211. As a result, in the third processing (step S221), the third image D3 indicating the store guidance information regarding the Pizza Italian restaurant is generated.

As described above, in the second operation example, the processing device 11 as the image generator CCP_1 executes the first processing (step S201) using the map application AP_1 which is an example of the first application program. In addition, the processing device 11 executes the second processing (steps S202 and S211) using the map application AP_1 and the AR application AP_2 which is an example of the second application program. In addition, the processing device 11 determines a parameter (store) based on the result of the second processing (step S202 or S211). Furthermore, the processing device 11 executes the third processing (step S221) using the store guidance application AP_3 which is an example of the third application program. In the third processing (step S221), the processing device 11 executes the store guidance application AP_3 with reference to the determined parameter (store).

Also in the second operation example, the third image D3 (refer to FIG. 8C) displayed at the start point T3s of the third period T3 is generated based on the result of the second processing (step S202 or S211). Therefore, it is possible to have a correlation between the second image D2 (refer to FIG. 8B) displayed at the end point T2e of the second period T2 and the third image D3 displayed at the start point T3s of the third period T3. In this case, there is a correlation between the third image D3 and the second image D2 in that both are images related to the store instructed by the user. In addition, since the third image D3 is different from the image displayed at the end point T1e of the first period T1 (refer to FIG. 8A), new information can be provided to the user by the third image D3. As a result, the convenience of the information processing device 100 is improved as compared with the case where the same image as the end point T1e of the first period T1 is displayed on the display device 14 at the start point T3s of the third period T3.

Note that, in the second operation example, the AR application AP_2 need not be executed in the second processing.

Third Operation Example of First Embodiment

FIG. 9 is a sequence diagram illustrating a linkage among electronic ticket processing OP500, map processing OP200, store guidance processing OP400, and main processing OP100 executed in a third operation example. FIGS. 10A, 10B, and 10C are diagrams illustrating the transition of the display screen of the display device 14 in the third operation example.

In the third operation example, the processing device 11 executes an electronic ticket application AP_4, a map application AP_1, and a store guidance application AP_3, each of which is an application among the applications AP_1 to AP_N, and a control program CP.

When the electronic ticket application AP_4 is executed, the processing device 11 executes the electronic ticket processing OP500 illustrated in FIG. 9. When the map application AP_1 is executed, the processing device 11 executes the map processing OP200 illustrated in FIG. 9. When the store guidance application AP_3 is executed, the processing device 11 executes the store guidance processing OP400 illustrated in FIG. 9. When the control program CP is executed, the processing device 11 executes the main processing OP100 illustrated in FIG. 9.

In the third operation example, the processing device 11 executes the first processing in step S301 of the electronic ticket processing OP500. In the first period T1 in which first processing continues, the processing device 11 functions as the image generator CCP_1. The processing device 11 executes a procedure for purchasing an electronic ticket desired by the user according to an operation on the operation device 15. The processing device 11 generates the first image D1 indicating the electronic ticket purchased by the user, and stores the generated first image D1 in the storage device 12.

On the other hand, in step S331 of the main processing OP100, the processing device 11 functions as the display controller CCP_2. The processing device 11 displays the image D in the storage device 12, namely, the first image D1 on the display device 14 whose display mode is the first display mode. FIG. 10A illustrates the first image D1 displayed on the display surface 41S of the display device 14 at this time. In this example, an image of an electronic ticket purchased by the user is displayed on the display device 14 as the first image D1.

By operations such as executing the processing according to the request from the user, the processing device 11 stores the activation control data AC in the storage device 12 every time the execution mode of the first processing changes. In the third operation example, the activation control data AC last stored in the storage device 12 within the first period T1 includes designation data that designates the map processing OP200 based on the map application AP_1 and includes a parameter indicating the name of the concert venue for which the user purchased the electronic ticket.

When the display mode of the display device 14 is switched from the first display mode to the second display mode, the processing device 11 functions as the switching controller CCP_3 in step S332 of the main processing OP100. When the processing device 11 has detected this switching, the processing device 11 stores the display mode data DS indicating the second display mode in the storage device 12.

Next, in step S333 of the main processing OP100, the processing device 11 functions as the switching controller CCP_3. The processing device 11 activates the map processing OP200 based on the map application AP_1 in accordance with the activation control data AC in the storage device 12. This ends the first period T1 and starts the second period T2.

The processing device 11 as the image generator CCP_1 executes the map processing OP200 and executes the second processing in step S311. Then, in the second processing of step S311, the processing device 11 accesses a map database on the network by the communication device 13, and searches for a concert venue indicated by the parameter included in the activation control data AC. The processing device 11 then acquires the second image D2, which is a map image around the concert venue, from the map database, and stores the acquired second image D2 as the image D in the storage device 12.

On the other hand, the processing device 11 functions as the display controller CCP_2 in step S334 of the main processing OP100. The processing device 11 causes the display device 14 in the second display mode to display the image D in the storage device 12, that is, the second image D2. FIG. 10B illustrates the second image D2 displayed on the display surface 41S of the display device 14 at this time. In this example, since the user has purchased the electronic ticket for a concert held at ABC Hall (refer to FIG. 10A), a map image of the surroundings of ABC Hall is generated as the second image D2 in the second processing of step S311. The generated map image is displayed on the display device 14 in step S334.

When a desired position in the second image D2 (in this case, the map image) displayed on the display device 14 is instructed by the user's operation on the operation device 15, the user can request the information processing device 100 to provide information regarding a store at the instructed position. In the third operation example, a position Pst in the second image D2 illustrated in FIG. 10B is instructed by the user. In a case where the user performs an operation of instructing a desired position on the map image on the operation device 15, the processing device 11 specifies a store corresponding to the instructed position in the second processing of step S311. Subsequently, the processing device 11 generates the activation control data AC including the designation data that designates the store guidance processing OP400 based on the store guidance application AP_3 and including the parameter indicating the specified store, and stores the activation control data AC in the storage device 12.

When the display mode of the display device 14 is switched from the second display mode to the first display mode, the processing device 11 functions as the switching controller CCP_3 in step S335 of the main processing OP100. When the processing device 11 has detected this switching, the processing device 11 stores the display mode data DS indicating the first display mode in the storage device 12.

Next, in step S336 of the main processing OP100, the processing device 11 functions as the switching controller CCP_3. The processing device 11 activates the store guidance processing OP400 based on the store guidance application AP_3 according to the activation control data AC in the storage device 12. This ends the second period T2 and starts the third period T3.

The processing device 11 as the image generator CCP_1 executes the store guidance processing OP400, and executes the third processing in step S321. In the third processing, the processing device 11 generates the third image D3, which is a store guidance image having an image size corresponding to the first display mode, and stores the generated third image D3 in the storage device 12 as the image D. At that time, the processing device 11 generates a guidance image regarding the store indicated by the parameter included in the activation control data AC, as the third image D3.

On the other hand, the processing device 11 functions as the display controller CCP_2 in step S337 of the main processing OP100. The processing device 11 causes the display device 14 in the first display mode to display the image D in the storage device 12, that is, the third image D3. In this manner, in the second image D2 illustrated in FIG. 10B, the third image D3 indicating the guidance information regarding the store at the position Pst is displayed on the display device 14. FIG. 10C illustrates the first image D1 displayed on the display surface 41S of the display device 14 at this time. In this example, the store located at the position Pst is ABC bookstore. By viewing the third image D3, the user can obtain guidance information such as an address, a telephone number, and business hours.

As described above, in the third operation example, the processing device 11 as the image generator CCP_1 executes the first processing (step S301) using the electronic ticket application AP_4 which is an example of the first application program. In addition, the processing device 11 executes the second processing (step S311) using the map application AP_1 which is an example of the second application program. In addition, the processing device 11 determines a parameter (store) based on the result of the second processing (step S311). Furthermore, the processing device 11 executes the third processing (step S321) using the store guidance application AP_3 which is an example of the third application program. In the third processing (step S321), the processing device 11 executes the store guidance application AP_3 using the determined parameter (store).

Also in the third operation example, the third image D3 (store guidance image) displayed at the start point T3s of the third period T3 is generated based on the result of the second processing (step S311). Therefore, it is possible to have a correlation between the third image D3 (store guidance image) displayed at the start point T3s of the third period T3 and the second image D2 (refer to FIG. 10B) displayed at the end point T2e of the second period T2. In this case, there is a correlation in that the third image D3 is an image related to the store instructed by the user, in the second image D2.

In addition, since the third image D3 is different from the image displayed at the end point T1e of the first period T1 (refer to FIG. 10A), new information is provided to the user. Specifically, in the third operation example, in a case where the user has purchased the electronic ticket (first image D1) for entering the concert venue, the user can obtain the guidance information (third image D3) of the store near the concert venue by providing the operation information (instructed position Pst) used for the second processing of generating the second image D2 (refer to FIG. 10B). Therefore, the convenience of the information processing device 100 can be enhanced as compared with the case where the same image as the end point T1e of the first period T1 is displayed on the display device 14 at the start point T3s of the third period T3.

In the third operation example, the map application AP_1 which is an example of the second application may be executed in the third processing. In this case, the processing device 11 preferably generates the third image D3 by scrolling the map image such that the determined parameter (store) is located at the center of the display surface in the third processing.

Fourth Operation Example of First Embodiment

FIG. 11 is a sequence diagram illustrating a linkage among the map processing OP200, the store guidance processing OP400, and the main processing OP100 executed in a fourth operation example. In the fourth operation example, the processing device 11 executes the map application AP_1 included in the applications AP_1 to AP_N, the store guidance application AP_3 included in the applications AP_1 to AP_N, and the control program CP.

When the map application AP_1 is executed, the processing device 11 executes the map processing OP200 illustrated in FIG. 11. When the store guidance application AP_3 is executed, the processing device 11 executes the store guidance processing OP400 illustrated in FIG. 11. When the control program CP is executed, the processing device 11 executes the main processing OP100 illustrated in FIG. 11.

In step S501 of the map processing OP200, the processing device 11 executes the first processing. This first processing is basically similar to the first processing (step S101) in the first operation example (refer to FIG. 5). The first image D1 (map image) generated in the first processing is displayed on the display surface 41S in step S111 of the main processing OP100.

However, in the first processing (step S101) in the fourth operation example, a desired position in the first image D1 (map image) displayed on the display surface 41S is instructed by the user, and a parameter indicating a store name at the instructed position is generated. Subsequently, in the first processing, the processing device 11 stores the activation control data AC including the designation data that designates the store guidance processing OP400 and including the parameter indicating the store name, in the storage device 12.

When the display mode of the display device 14 is switched from the first display mode to the second display mode, the processing device 11 functions as the switching controller CCP_3 in step S522 of the main processing OP100. When the processing device 11 has detected this switching, the processing device 11 stores the display mode data DS indicating the second display mode in the storage device 12.

Next, in step S523 of the main processing OP100, the processing device 11 as the switching controller CCP_3 activates the store guidance processing OP400 according to the activation control data AC in the storage device 12. This ends the first period T1 and starts the second period T2.

The processing device 11 as the image generator CCP_1 executes the second processing in step S511 of the store guidance processing OP400. In the second processing, the processing device 11 refers to the store name indicated by the parameter included in the activation control data AC in the storage device 12, and searches for the website of the store corresponding to the store name that has been referred to. The processing device 11 then accesses the website of the searched store by using the communication device 13, and acquires an image provided by the website as the second image D2. The processing device 11 stores the second image D2 as the image D in the storage device 12.

On the other hand, in step S524 of the main processing OP100, the processing device 11 functions as the display controller CCP_2. The processing device 11 causes the display device 14 in the second display mode to display the image D in the storage device 12, that is, the second image D2 provided by the website of the store.

In this mode, the user can purchase a product posted on the website by operating the operation device 15. When the user purchases an item, the image of the receipt is transmitted from the website to the information processing device 100. The image of the receipt is received by the communication device 13 of the information processing device 100 and stored in the storage device 12. In the second processing (step S511) of the store guidance processing OP400, the processing device 11 stores the activation control data AC including the designation data designating the third processing (step S502) of the map processing OP200 and including the parameter indicating the storage destination address in the storage device 12 of the received image of the receipt, in the storage device 12.

When the display mode of the display device 14 is switched from the second display mode to the first display mode, the processing device 11 functions as the switching controller CCP_3 in step S525 of the main processing OP100. When having detected the switching, the processing device 11 stores the display mode data DS indicating the first display mode in the storage device 12.

Next, in step 526 of the main processing OP100, the processing device 11 as the switching controller CCP_3 activates the third processing (step S502) of the map processing OP200 in accordance with the activation control data AC in the storage device 12. This ends the second period T2 and starts the third period T3.

The processing device 11 as the image generator CCP_1 executes the third processing in step S502 of the map processing OP200. In the third processing, the processing device 11 reads the image of the receipt from the storage device 12 using the storage destination address indicated by the parameter included in the activation control data AC. Subsequently, the processing device 11 generates a third image D3 including the image of the receipt and the map image generated according to the operation of the operation device 15, and stores the third image D3 in the storage device 12 as the image D.

On the other hand, in step S527 of the main processing OP100, the processing device 11 functions as the display controller CCP_2. The processing device 11 causes the display device 14 in the first display mode to display the image D in the storage device 12, that is, the third image D3 including the image of the receipt and the map image. The user walks while viewing the map image displayed on the display device 14, thereby arriving at the store where the product has been purchased. The user can receive the product by presenting the receipt displayed on the display device 14 to the store clerk.

As described above, in the fourth operation example, the processing device 11 as the image generator CCP_1 executes the first processing (step S501) using the map application AP_1 which is an example of the first application program. The processing device 11 executes the second processing (step S511) using the store guidance application AP_3 which is an example of the second application program. The processing device 11 determines a parameter (storage address of the image of the receipt) based on the result of the second processing (step S511). The processing device 11 executes the third processing (step S502) using the map application AP_1 which is an example of the first application program. In the third processing (step S502), the processing device 11 executes the map application AP_1 using the determined parameter (storage address of the image of the receipt). Also in the fourth operation example, the convenience of the information processing device 100 can be enhanced as compared with the case where the same image as the end point T1e of the first period T1 is displayed on the display device 14 at the start point T3s of the third period T3.

As described above, according to the present embodiment, the display device 14 can switch the display mode between the first display mode and the second display mode in which the display area is larger than the display area in the first display mode. It is assumed that the display mode of the display device 14 is the first display mode over the first period T1, becomes the second display mode over the second period t2 after the first period T1, and becomes the first display mode over the third period T3 after the second period T2. In this case, the image generator CCP_1 generates the first image D1 by the first processing executed over the first period T1, generates the second image D2 by the second processing executed over the second period T2, and generates the third image D3 by the third processing executed over the third period T3. The display controller CCP_2 causes the display device 14 to display the first image D1 over the first period T1, causes the display device 14 to display the second image D2 over the second period T2, and causes the display device 14 to display the third image D3 over the third period T3. The image displayed on the display device 14 at a start point T3s of third period T3 in third image D3 is different from the image displayed on the display device 14 at the end point T1s of the first period T1 in the first image D1. In addition, the third processing is executed using the result of the second processing.

According to the above configuration, the third processing is executed using the result of the second processing executed after the first processing. Therefore, the image displayed on the display device 14 at the start point T3s of the third period T3 in the third image D3 is different from the image displayed on the display device 14 at the end point T1s of the first period T1 in the first image D1. This makes it possible to provide new information to the user. As a result, the convenience of the information processing device 100 is improved as compared with the case where the same image as the end point T1e of the first period T1 is displayed on the display device 14 at the start point T3s of the third period T3.

Furthermore, according to the present embodiment, the image displayed on the display device 14 at the start point T3s of the third period T3 in the third image D3 is different from the image displayed on the display device 14 at the end point T2e of the second period T2 in the second image D2. Accordingly, at the start point T3s of the third period T3, information different from the information provided to the user at the end point T2e of the second period T2 is provided. Moreover, since the third processing is executed using the result of the second processing, it is possible to have a correlation between the second image D2 and the third image D3. This result in improvement of the convenience of the information processing device 100.

Furthermore, according to the present embodiment, the image displayed on the display device 14 at the end point T2e of the second period T2 in the second image D2 is different from the image displayed on the display device 14 at the end point T1e of the first period T1 in the first image D1. Accordingly, at the end point T2e of the second period T2, information different from the information provided to the user at the end point T1e of the first period T1 is provided. This result in improvement of the convenience of the information processing device 100.

Furthermore, according to the present embodiment, the image generator CCP_1 executes the first processing and the third processing using the first application program, determines the parameter based on the result of the second processing, and executes, in the third processing, the first application program using the determined parameter. According to this aspect, the first application program is executed in both the first processing and the third processing. Even when the same first application program is executed, the third processing uses the parameter based on the result of the second processing. Therefore, the image displayed on the display device 14 at the start point T3s of the third period T3 in the third image D3 is different from the image displayed on the display device 14 at the end point T1s of the first period T1 in the first image D1. This makes it possible to provide new information to the user.

Furthermore, according to the present embodiment, the image generator CCP_1 executes the first processing using the first application program, executes the second processing using the first application program or the second application program, determines a parameter based on a result of the second processing, executes the third processing using the second application program or the third application program, and executes, in the third processing, the second application program or the third application program using the determined parameter. According to the above aspect, since the parameter is determined using the result of the second processing, it is possible to have a correlation between the second image D2 and the third image D3. This result in improvement of the convenience of the information processing device 100.

Second Embodiment

FIGS. 12A and 12B are perspective views illustrating an appearance of an information processing device 100a according to a second embodiment of the present disclosure. The information processing device 100a in the present embodiment is different from that in the first embodiment in the configuration of the display device 14.

The information processing device 100a includes housings 41 and 42 and a hinge 49 similarly to the first embodiment. In the first embodiment, the information processing device 100 has the two display surfaces 41S and 42S. In contrast, the information processing device 100a according to the present embodiment has three display surfaces 43S, 44S, and 45S each having a rectangular shape. Specifically, the housing 41 has the display surfaces 45S and 44S on their two surfaces, namely, front and back surfaces, while the housing 42 has the display surface 44S on one of their two surfaces, namely, front and back surfaces. The hinge 49 joins a long side of the rectangular end surface 41E of the housing 41 facing the display surface 43S and a long side of the rectangular end surface 42E of the housing 42 facing the display surface 44S to each other.

In the present embodiment, the hinge angle θ formed by the display surfaces 43S and 44S changes together with the rotation of the hinge 49. In the present embodiment, by setting the hinge angle θ to 0 degrees, the user can set the display mode of the display device of the information processing device 100a to the first display mode in which the display surfaces 43S and 44S face each other and display is performed only on the display surface 45S facing outward, as illustrated in FIG. 12A. Furthermore, by setting the hinge angle θ to 180 degrees, the user can set the display mode of the display device of the information processing device 100a to the second display mode in which the display surface 41S and the display surface 42S face outward and display is performed by both the display surface 43S and the display surface 44S as illustrated in FIG. 12B. Here, the total display area of the display surfaces 43S and 44S is larger than the display area of the display surface 45S. Therefore, the second display mode is a display mode having a larger display area than the first display mode.

In the present embodiment, the control program and the application executed by the processing device 11 are similar to those in the first embodiment. Therefore, also in the present embodiment, the effects similar to those of the first embodiment can be obtained. In addition, in the present embodiment, in the first display mode, the display surfaces 43S and 44S face each other, and the user's finger or the like does not touch the display surfaces. Therefore, for example, in the first display mode, there is an advantage of eliminating the necessity of the processing such as invalidating an operation on the touch panels provided on the display surfaces 43S and 44S.

Modifications

The present disclosure is not limited to the above-described embodiments. Specific modification are exemplified below. Two or more aspects arbitrarily selected from the following examples may be combined to each other.

(1) The conceivable modifications of the first operation example include the following aspects. As the first processing, an assumable case is that during the game processing based on the game application, the user is stuck in the middle of the game. In this case, when the user switches from the first display mode to the second display mode, the second processing of the game processing is executed, and a hint regarding the progress of the game is displayed on the display device 14 in the second display mode. When the user switches from the second display mode to the first display mode, third processing of reflecting the hint on the game screen is executed in the game processing. Specifically, by displaying an arrow or highlighting on the game screen, a hint is explicitly indicated to the user. Also in this aspect, effects similar to those of the first operation example can be obtained.

(2) As another modification of the first operation example, the following aspect is also conceivable. It is assumed that during execution of the first processing based on a certain application according to the operation performed by the user, the user falls in a difficult situation in continuing the operation. In this case, when the user switches from the first display mode to the second display mode, the second processing is executed, and then help information for getting out of the difficult situation is displayed on the display device 14 in the second display mode. When the user switches from the second display mode to the first display mode, the third processing is executed. In the third processing, the help information is displayed to be overlaid over the original display information of the third processing.

(3) In the first embodiment, in the first processing, the activation control data AC including the parameter used for the second processing is stored in the storage device 12. Alternatively, it is also allowable, in the first processing, to store the activation control data AC including the first parameter used for the second processing and the second parameter used for the third processing, in the storage device 12. In this case, in the second processing, similarly to the first embodiment, the activation control data AC including the parameter used for the third processing (defined as a third parameter for clarification) is stored in the storage device 12. Subsequently, the third processing uses the second parameter stored in the storage device 12 in the first processing and the third parameter stored in the storage device 12 in the second processing. According to this aspect, both the result of the first processing and the result of the second processing can be involved in the third processing, leading to further enhancement of the convenience of the information processing device 100.

(4) In the first embodiment, the third processing uses the result of the second processing. In this case, it is also allowable to have a configuration of detecting the state of the information processing device 100, and using the state of the information processing device 100 at the end point of the second period or the state of the information processing device 100 at the start point of the third period, for the third processing.

For example, there may be the following aspects. First, similarly to the third operation example, the processing device 11 executes the electronic ticket application AP_4 in the first period and displays the first image D1 illustrated in FIG. 10A on the display surface 41S. Next, in the second period, the processing device 11 executes the map application AP_1 and displays the second image D2 illustrated in FIG. 10B on the display surface 41S and the display surface 42S. The position Pst indicated in FIG. 10B is a target position designated by the user in the second processing, and is an example of a result of the second processing.

The processing device 11 switches the application to be executed in the third period according to the state of the information processing device 100 at the end point of the second period. Specifically, in the second period, the processing device 11 continuously detects inclination information indicating the inclination of the information processing device 100 with respect to the horizontal state using the acceleration detection device 17. When the display mode is switched from the second display mode to the first display mode, the processing device 11 acquires the inclination information of the information processing device 100 at the end point of the second period, which is the switching timing.

At the end point of the second period, when the inclination of the information processing device 100 is substantially vertical, that is, when the information processing device 100 is in an upright state, it is considered that the user actively imaging the surrounding scenery. In this case, there is a high possibility that the user desires navigation by AR display. Accordingly, the processing device 11 displays the third image D3 illustrated in FIG. 13 on the display surface 41S, for example, by executing the AR application AP_2 in the third period. In the third image D3 illustrated in FIG. 13, "English conversation class" is displayed superimposed on the real landscape, with the direction to the goal displayed with an arrow. That is, the processing device 11 displays an AR screen in the third processing executed in the third period.

In contrast, when the inclination of the information processing device 100 at the end point of the second period is generally the same inclination as the inclination of the smartphone when the user views the screen of the smartphone, it is considered that the user desires guidance of the target store, rather than AR display. Accordingly, the processing device 11 displays the third image D3 illustrated in FIG. 10C on the display surface 41S, for example, by executing the store guidance application AP_3 in the third period. That is, the processing device 11 displays store guidance information in the third processing executed in the third period. In the above operation, at the end point of the second period, the processing device 11 determines whether the inclination of the information processing device 100 with respect to the horizontal state is within a predetermined range. The processing device 11 executes the AR application AP_2 when the determination result is affirmative, and executes the store guidance application AP_3 when the determination result is negative. The predetermined range is set to a range indicating that the user desires AR display. The predetermined range is, for example, 60 degrees or more and less than 120 degrees. The user may be allowed to set the predetermined range.

Furthermore, acquisition of the inclination of the information processing device 100 with respect to the horizontal state is not limited to the end point of the second period, and may be the start point of the third period.

According to this modification, the image generator CCP_1 determines a parameter based on the result of the second processing executed over the second period, determines an application program to be executed in the third period among the plurality of application programs according to the state of the information processing device 100 at the end point of the second period or the start point of the third period, and then executes the determined application program using the parameter determined in the third period. As a result, the third processing is executed in the third period. The inclination of the information processing device 100 with respect to the horizontal state is an example of the information processing device 100. The position Pst is an example of a parameter based on the result of the second processing. The AR application AP_2 and the store guidance application AP_3 are examples of a plurality of application programs.

As described above, the application program to be executed in the third period among the plurality of application programs is determined according to the state of the information processing device 100 at the end point of the second period or the start point of the third period. This makes it possible to improve the convenience of the information processing device 100.

(5) In the second embodiment, display is performed on the separate display surfaces 43S and 44S in the second display mode. Alternatively, the information processing device 100*a* may be provided with one continuous display surface extending over the housings 41 and 42 and having a larger display area than the display surface 45S, and display in the second display mode may be performed by the display surface.

(6) In each of the above embodiments, the smartphone is exemplified as the information processing device 100 or 100*a*. However, the information processing device 100 or 100*a* can take any specific form, not limited to the examples of individual forms described above. For example, the information processing device 100 or 100*a* may take a form of a portable or stationary personal computer.

(7) In each of the above embodiments, the storage device 12 is a recording medium that can be read by the processing device 11, examples of which described as ROM and the RAM. However, the storage device 12 can be any form of an appropriate storage medium, such as a flexible disk, a magneto-optical disk (for example, a compact disc, a digital versatile disc, or a Blu-ray (registered trademark) disc), a smart card, a flash memory device (for example, a card, a stick, or a key drive), CD-ROM (Compact Disc-ROM), a register, a removable disk, a hard disk, a floppy (registered trademark) disk, a magnetic strip, a database, and a server. In addition, the program may be transmitted from a network via a telecommunication line. Furthermore, the program may be transmitted from a communication network via a telecommunication line. Note that the base station may include an input device such as an input key and an output device such as a display.

(8) Each of the above embodiments may be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), or other appropriate systems, and/or a next-generation system extended based on these systems.

(9) In each of the above embodiments, the described information, signals, and the like may be represented using any of a variety of different technologies. For example, data, commands, information, signals, bits, symbols, chips, and the like included in the above description may be represented by voltages, currents, electromagnetic waves, magnetic fields or magnetic particles, optical fields or photons, or any combination of these. Note that the terms described in the present specification and/or terms necessary for understanding the present specification may be replaced with terms having the same or similar meanings.

(10) In each of the above embodiments, the input/output information and the like may be stored in a specific location (for example, memory) or may be managed in a management table. The input/output information and the like can be overwritten, updated, or can receive additionally written information. The output information and the like may be deleted. The input information and the like may be transmitted to another device.

(11) In each of the above embodiments, determinations may be performed by a value represented by one bit (0 or 1), may be performed by a true/false value (Boolean: true or false), or may be performed by comparison of numerical values (for example, comparison with a predetermined value).

(12) In the flowcharts exemplified in the above embodiments, the order of the steps may be changed. That is, the order of each processing in the preferred aspect of the present disclosure is not limited to a specific order.

(13) Each function disclosed in the above embodiment is implemented by combination of hardware and software in any manner. In addition, each function may be implemented by a single device, or may be implemented by two or more devices provided separate from each other.

(14) The program exemplified in each of the above embodiments should be interpreted broadly to represent a command, a command set, a code, a code segment, a program code, a subprogram, a software module, an application, a software application, a software package, a routine, a subroutine, an object, an executable file, an execution thread, a procedure, a functionality, or the like, regardless of whether the program is referred to as software, firmware, middleware, microcode, or a hardware description language, or as other names. In addition, software, commands, and the like may be transmitted and received via a transmission medium. For example, when software is transmitted from a website, a server, or other remote sources by using a wired technology such as a coaxial cable, an optical fiber cable, a twisted pair, and a digital subscriber line (DSL) and/or a wireless technology such as infrared, radio, and microwave, these wired and/or wireless technologies are included in the definition of the transmission medium.

(15) In each of the above embodiments, the information processing device 100 or 100*a* may be a mobile station. The mobile station may also be referred to, by those skilled in the art, as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable term.

(16) In each of the above embodiments, the term "connected" or any variation thereof means any direct or indirect connection or coupling between two or more elements, and may include the presence of one or more intermediate elements between two elements that are "connected" to each other. The connection between the elements may be physical, logical, or a combination thereof. As used herein, two elements can be considered to be "connected" to one another by using one or more wires, cables, and/or printed electrical connections, and as some non-limiting and non-exhaustive examples, by using electromagnetic energy such as electromagnetic energy having wavelengths in the radio frequency region, the microwave region, and the light region (regardless of visible or invisible).

(17) In the above embodiments, the description "based on" does not mean "based only on" unless otherwise specified. In other words, the description "based on" means both "based only on" and "based at least on".

(18) The terms "including", "comprising", and variations thereof used in the specification or claims, these terms are intended to be inclusive in a manner similar to the term "having". Furthermore, the term "or" used in the present specification or claims is not intended to be an exclusive OR.

(19) Throughout this application, articles added by translation, such as "a", "an", and "the" in English, these articles include a plurality unless the context clearly dictates otherwise.

(20) It will be apparent to those skilled in the art that the present invention is not limited to the embodiments described herein. The present invention can be implemented as modifications and variations without departing from the scope and the spirit of the present invention defined based on the description of the claims. Accordingly, the description herein is provided just for the purpose of illustrative description and has no restrictive meaning to the present invention. In addition, a plurality of aspects selected from the aspects exemplified in the present specification may be combined to each other.

The effects described in individual embodiments of the present specification are merely examples, and thus, there may be other effects, not limited to the exemplified effects.

Note that the present technique can also have the following configurations.

(1)

An information processing device comprising:

a display device capable of switching a display mode between a first display mode and a second display mode, the second display mode having a display area larger than a display area in the first display mode;

an image generator that generates first to third images such that, when a display mode of the display device is the first display mode over a first period, the display mode is the second display mode over a second period after the first period, and the display mode is the first display mode over a third period after the second period, the image generator generates a first image by first processing executed over the first period, generates a second image by second processing executed over the second period, and generates a third image by third processing executed over the third period; and a display controller that causes the display device to display the first image over the first period, causes the display device to display the second image over the second period, and causes the display device to display the third image over the third period, wherein an image displayed on the display device at a start point of the third period, out of the third images, is different from an image displayed on the display device at an end point of the first period, out of the first images, and the third processing uses a result of the second processing.

(2)

The information processing device according to (1), wherein the image displayed on the display device at the start point of the third period out of the third images is different from an image displayed on the display device at an end point of the second period out of the second images.

(3)

The information processing device according to claim 1 or 2, wherein the image displayed on the display device at the end point of the second period out of the second images is different from the image displayed on the display device at the end point of the first period out of the first images.

(4)

The information processing device according to any one of (1) to (3), wherein the image generator executes the first processing and the third processing using a first application program, determines a parameter based on a result of the second processing, and executes, in the third processing, the first application program by using the determined parameter.

(5)

The information processing device according to any one of (1) to (3), wherein the image generator determines a parameter based on a result of the second processing, determines an application program to be executed in the third period from among a plurality of application programs in accordance with a state of the information processing device at the end point of the second period or the start point of the third period, and executes, in the third processing, the determined application program by using the determined parameter.

(6)

The information processing device according to any one of (1) to (3), wherein the image generator executes the first processing by using the first application program, executes the second processing by using the first application program or the second application program, determines a parameter based on a result of the second processing, executes the third processing by using the second application program or the third application program, and executes, in the third processing, the second application program or the third application program by using the determined parameter.

(7)

A method of controlling a display device, the display device being capable of switching a display mode between a first display mode and a second display mode, the second display mode having a display area larger than a display area in the first display mode, the method comprising:

generating and displaying first to third images such that, when a display mode of the display device is the first display mode over a first period, the display mode is the second display mode over a second period after the first period, and the display mode is the first display mode over a third period after the second period, generating a first image by first processing executed over the first period and displaying the generated first image on the display device, generating a second image by second processing executed over the second period and displaying the generated second image on the display device, and generating a third image by third processing executed over the third period and displaying the generated third image on the display device, wherein an image displayed on the display device at a start point of the third period, out of the third images, is different from an image displayed on the display device at a start point of the first period, out of the first images, and the third processing uses a result of the second processing.

REFERENCE SIGNS LIST

100, 100a Information Processing Device
11 Processing Device
12 Storage Device
13 Communication Device
14 Display Device
15 Operation Device
16 Positioning Device
17 Acceleration Detection Device

18 Open/Close Detection Device
41, 42 Housing
41E, 42E End Surface
49 Hinge
41S, 42S, 43S, 44S, 45S Display Surface
AP_1 to AP_N Application
CP Control Program
CCP_1 Image Generator
CCP_2 Display Controller
CCP_3 Switching Controller
OP100 Main Processing
OP200 Map Processing
OP300 AR Processing
OP400 Store Guidance Processing
OP500 Electronic Ticket Processing
The invention claimed is:

1. An information processing device comprising:
circuitry configured to control an image to be displayed on a display that operates in a first display mode and a second display mode, the second display mode having a display area larger than a display area in the first display mode, wherein the circuitry is configured to:
generate a first image for display in the first display mode during a first period using a first processing;
in response to the display being switched to the second display mode, generate a second image using a second processing during a second period after the first period, the second image including additional information regarding content in the first image and the second processing includes determining user instructions received during the second period; and
in response to the display being switched back to the first display mode during a third period after the second period, a third image using a third processing executed over the third period, the third processing includes determining the third image based on the user instructions; and
control the display to display the first image over the first period, the second image over the second period, and the third image over the third period,
wherein the third image; is different from the first image based on the user instructions.

2. The information processing device according to claim 1, wherein the third image is different from the second image.

3. The information processing device according to claim 1, wherein the second image is different from the first image.

4. The information processing device according to claim 1,
wherein
the first processing and the third processing are executed using a first application program,
and
executes, in the third processing, the first application program by using the user instructions.

5. The information processing device according to claim 1,
wherein the circuitry is further configured to:
determine an application program to be executed in the third period from among a plurality of application programs in accordance with a state of the information processing device at the end point of the second period or the start point of the third period, and
executes, in the third processing, the application program by using the user instructions.

6. The information processing device according to claim 1, wherein the circuitry is further configured to:
execute the first processing by using the first application program,
execute the second processing by using the first application program or the second application program,
execute the third processing by using the second application program or the third application program, and
execute, in the third processing, the second application program or the third application program by using the user instructions.

7. The information processing device according to claim 1, wherein the second image includes a map based on the content of the first image.

8. The information processing device according to claim 1, wherein the display is switchable between the first display mode and the second display mode by using a hinge structure.

9. A method of controlling a display, the display capable of switching a display mode between a first display mode and a second display mode, the second display mode having a display area larger than a display area in the first display mode, the method comprising:
during a first display mode over a first period, generating a first image by first processing executed over the first period and displaying the first image on the display,
in response to the display being switched to the second display mode in a second period after the first period, generating a second image by second processing executed over the second period and displaying the second image on the display, the second image including additional information regarding content in the first image and the second processing includes determining user instructions received during the second period;
in response to the display being switched back to the first mode in a third period after the second period, generating a third image by third processing executed over the third period and displaying the third image on the display, the third processing includes generating the third image based on the user instructions; and
displaying, on the display, the first image over the first period, the second image over the second period, and the third image over the third period,
wherein the third image is different from the first image based on the user instructions.

10. The method according to claim 9, wherein the third image is different from the second image.

11. The method according to claim 9, wherein the second image is different from the first image.

12. The method according to claim 9, further comprising:
using a first application program to execute the first processing and the third processing, and
using the first application program and the user instructions to execute the third processing.

13. The method according to claim 9, further comprising:
determining an application program to be executed in the third period from among a plurality of application programs in accordance with a state of the information processing device at the end point of the second period or the start point of the third period, and
executing, in the third processing, the application program by using the user instructions.

14. The method according to claim 9, further comprising:
executing the first processing by using the first application program,
executing the second processing by using the first application program or the second application program, executing the third processing by using the second application program or the third application program, and executing, in the third processing, the second application program or the third application program by using the user instructions.

15. The method according to claim 9, wherein the display is switchable between the first display mode and the second display mode by using a hinge structure.

16. A display system, comprising:

a display configured to operates in the first display mode and the second display mode; and the information processing device according to claim 1.

17. A non-transitory computer readable storage device having computer readable instructions that when executed by circuitry cause the circuitry to:

control an image to be displayed on a display that operates in a first display mode and a second display mode, the second display mode having a display area larger than a display area in the first display mode;

generate a first image for display in the first display mode during a first period using a first processing, in response to the display being switched to the second display mode, generate a second image using a second processing during a second period after the first period, the second image including additional information regarding content in the first image and the second processing includes determining user instructions received during the second period; and in response to the display being switched back to the first display mode during a third period after the second period, generate a third image using a third processing executed over the third period, the third processing includes determining the third image based on the user input to the second image; and control the display to display the first image over the first period, the second image over the second period, and the third image over the third period, wherein the third image is different from the first image based on the user instructions.

18. The non-transitory computer readable storage device according to claim 17, wherein the third image is different from the second image.

19. The non-transitory computer readable storage device according to claim 17, wherein the second image is different from the first image.

20. The non-transitory computer readable storage device according to claim 17, wherein the circuitry is further caused to:

use a first application program to execute the first processing and the third processing, and use the first application program and the user instructions to execute the third processing.

21. The non-transitory computer readable storage device according to claim 17, wherein the circuitry is further caused to:

determine an application program to be executed in the third period from among a plurality of application programs in accordance with a state of an information processing device controlled by the circuitry at the end point of the second period or the start point of the third period, and execute, in the third processing, the application program by using the user instructions.

22. The non-transitory computer readable storage device according to claim 17, wherein the circuitry is further caused to:

execute the first processing by using the first application program, execute the second processing by using the first application program or the second application program, execute the third processing by using the second application program or the third application program, and execute, in the third processing, the second application program or the third application program by using the user instructions.

23. The non-transitory computer readable storage device according to claim 17, wherein the display is switchable between the first display mode and the second display mode by using a hinge structure.

* * * * *